United States Patent [19]

Yoshinobu

[11] Patent Number: 5,734,444
[45] Date of Patent: Mar. 31, 1998

[54] BROADCAST RECEIVING APPARATUS THAT AUTOMATICALLY RECORDS FREQUENCY WATCHED PROGRAMS

[75] Inventor: Hitoshi Yoshinobu, Kanagawa, Japan

[73] Assignee: Sony Corporation, Tokyo, Japan

[21] Appl. No.: 570,514

[22] Filed: Dec. 11, 1995

[30] Foreign Application Priority Data

Dec. 21, 1994 [JP] Japan .................. 6-335568

[51] Int. Cl.$^6$ ............... H04N 5/45; H04N 5/50
[52] U.S. Cl. .............. 348/731; 348/734; 386/83; 455/184.1; 455/185.1
[58] Field of Search .................. 348/564, 565, 348/567, 906, 731, 734, 569, 563; 455/184.1, 185.1, 187.1; 386/46, 83, 125, 126; H04N 5/50, 5/45

[56] References Cited

U.S. PATENT DOCUMENTS

| | | | |
|---|---|---|---|
| 5,329,376 | 7/1994 | Kimet et al. | 348/734 |
| 5,453,793 | 9/1995 | Kim | 386/83 |
| 5,506,528 | 4/1996 | Chun | 348/567 |
| 5,517,254 | 5/1996 | Monta et al. | 348/563 |
| 5,585,865 | 12/1996 | Amono et al. | 348/734 |

FOREIGN PATENT DOCUMENTS

| | | | |
|---|---|---|---|
| 07298148 A | 10/1995 | Japan | H04N 5/445 |
| 07298148 A | 11/1995 | Japan | H04N 5/44 |

Primary Examiner—Michael H. Lee
Assistant Examiner—Jeffrey S. Murrell
Attorney, Agent, or Firm—Jay H. Maioli

[57] ABSTRACT

A broadcast receiving apparatus having a control signal generator for generating a channel selection control signal in response to a channel selection performed by a user. The broadcast receiving apparatus further includes a channel selector for selecting a desired program channel from broadcast waves in response to the channel selection control signal. The apparatus further comprises a channel history memory for storing program channels, which have been selected by the channel selector on several occasions during past weeks, corresponding to the days of the weeks and the hours relative to the channel selections; a decision portions for checking the stored contents of the channel history memory and making a decision as to whether any frequent reception program channel selected and received at a frequency higher than a predetermined value exists on the same day of the week and at the same hour in the past; and a controller responsive to a detection of the existence of any frequent reception program channel executed by the decision portions and generating a control signal to instruct recording of the signal of the frequent reception program channel.

19 Claims, 10 Drawing Sheets

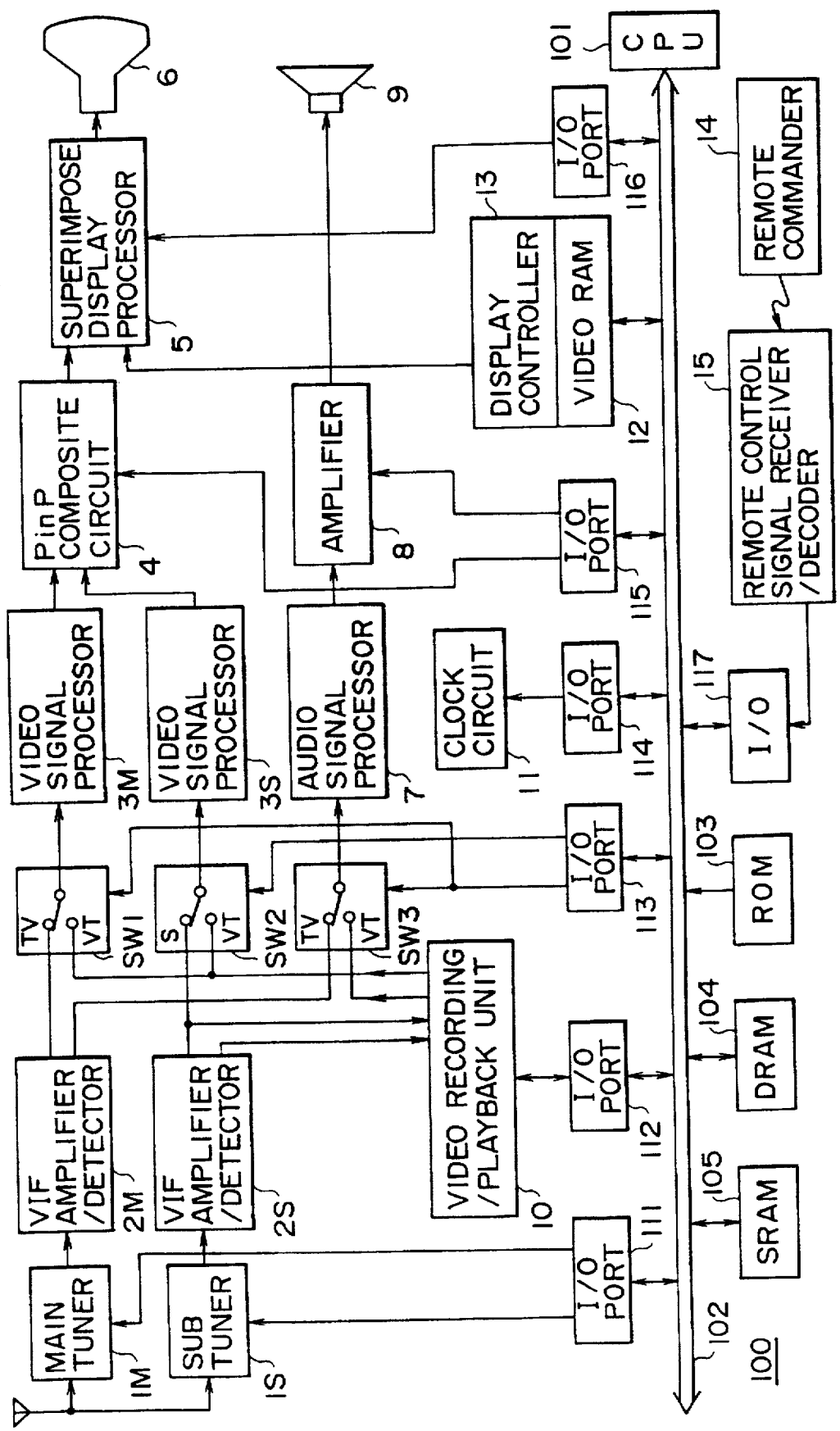

FIG. 5

CHANNEL HISTORY TABLE (ONE DAY)

| Time | Dch | |
|---|---|---|
| 00:01 | 0 | → TV NOT IN USE, OR VTR IN PLAYBACK |
| 00:11 | 0 | |
| 00:21 | 0 | |
| ⋮ | ⋮ | |
| 18:41 | 4 | → CHANNEL 4 RECEIVED |
| 18:51 | 4 | |
| 19:01 | 12 | → CHANNEL 12 RECEIVED |
| ⋮ | ⋮ | |
| 23:51 | 0 | |

FIG. 6

| Time | HISTORY OF TODAY THREE WEEKS AGO | HISTORY OF TODAY TWO WEEKS AGO | HISTORY OF TODAY ONE WEEK AGO (Dch) |
|---|---|---|---|
| 00:01 | 0 | 10 | 12 |
| 00:11 | 0 | 10 | 10 |
| 00:21 | 0 | 10 | 0 |
| ⋮ | ⋮ | ⋮ | ⋮ |
| 18:41 | 4 | 4 | 4 |
| 18:51 | 4 | 4 | 4 |
| PRESENT TIME 19:01 | 12 | 12 | 12 |
| ⋮ | ⋮ | ⋮ | ⋮ |
| 23:51 | 0 | 10 | 0 |

BROADCAST RECEIVING APPARATUS THAT AUTOMATICALLY RECORDS FREQUENCY WATCHED PROGRAMS

BACKGROUND OF THE INVENTION

1. Field of the Invention

The present invention relates to a broadcast receiving apparatus which prevents a user from missing his favorite program which is watched or listened to frequently in a television receiver or a radio receiver.

2. Description of the Related Art

In watching or listening to a broadcast program in a television or radio receiver, it is generally observed that a user usually intends to receive the same program every week at a specific time. In many cases, the receiving apparatus is tuned to the same program channel for selectively receiving that program at the same hour on the same day of the week, particularly with regard to any serial program or a favorite program of the user.

It is supposed in this specification that a term program channel signifies a channel number allocated to a broadcasting station and is distinguished from a transmission channel numbered per partial frequency band which is a division of a broadcast-wave transmission band.

When a user is watching or listening to a broadcast program by a television receiver or a radio receiver, a case may occur where the user carelessly keeps the receiver tuned in to some other program channel and misses his favorite program which is regularly received every week (hereinafter a broadcast program received frequently in this manner will be referred to as a frequent reception program, and a channel of such a frequent reception program will be referred to as a frequent reception program channel).

In view of the above, the present applicant previously proposed an improved receiving apparatus as disclosed in U.S. patent application Ser. No. 08/170,799 (filed on Dec. 21, 1993), wherein a selected channel data storage means is provided for successively storing the program channels selected by a tuner on each day of the week and on each hour which are used as parameters, and the frequency of each program channel selected by the tuner is calculated from the contents of the storage means, and a decision is made as to whether the relevant program channel is a frequent reception channel or not. When there is any frequent reception program channel on the same day of the week and the same hour relative to the present time point and the relevant channel presently is not coincident with the program channel being received, that is, when the broadcast program watched usually at a high frequency is not being watched at that time, advice information is displayed on the screen or is emitted in the form an audio output to thereby arouse the user's attention.

In the above previous proposal, the apparatus is so contrived that even when a power switch in the television receiver is in its off-state, an audio output representing the advice information for the user is emitted to arouse the user's attention.

However, if such advice information is supplied from the television or radio receiver to the user as described, there may still exist a case where the user misses watching or hearing such information. In this case, the desired favorite program has already started at the time of the user's notice of the advice information, and consequently it follows that the user misses the beginning of a mystery drama for example or fails to grasp the plot of the story.

Also in the absence of the user, such advice information is quite meaningless if outputted as mentioned, and the user is obliged to give up reception of his favorite program.

For the purpose of solving this problem, it may be contrived to perform a reserved recording operation for a frequent reception program channel by the use of a recorder/player such as a VTR. However, many users think that the manipulation for such reserved recording is generally complicated and, taking erroneous manipulation and so forth into account, it is not exactly expected that the users properly utilize the reserved recording function.

Furthermore, if there is any advice information that signifies the existence of a frequent reception program on another channel, the information generally obtainable in such a case is no more than "Usually you watch channel A now" or "Usually you listen to broadcast A now" for example, and it is impossible to directly find the content of the program therefrom. Accordingly, prior to selective change of the channel, the user needs to confirm the program of another channel on the basis of his memory or to find the content of that program by referring to a television program table or the like, whereby extreme inconvenience is unavoidable. In addition, due to some delay in changing the channel, there also arises the aforementioned problem that the user misses the beginning of a mystery drama or fails to grasp the plot of the story.

SUMMARY OF THE INVENTION

It is therefore an object of the present invention to provide a broadcast receiving apparatus which enables a user to watch his favorite frequent reception program without fail, although the user is not receiving and watching that program at present (including a case where a power switch is in an off-state).

According to one aspect of the present invention, there is provided a broadcast receiving apparatus having a channel selection control signal generator means for generating a channel selection control signal in response to a channel selection performed by a user, and a channel selector means for selecting a desired program channel from broadcast waves in response to the channel selection control signal. The broadcast receiving apparatus further comprises a channel history memory for storing program channels, which have been selected by the channel selector means on several occasions during past weeks, corresponding to the days of the weeks and the hours relative to the channel selections; a decision means for checking the stored contents of the channel history memory and making a decision as to whether any frequent reception program channel selected and received at a frequency higher than a predetermined value exists on the same day of the week and at the same hour in the past; and a control means responsive to a detection of the existence of any frequent reception program channel executed by the decision means and generating a control signal to instruct recording of the signal of the frequent reception program channel.

In the receiving apparatus of the present invention, when there is detected, from the stored contents of the channel history memory, the existence of any program channel usually received more frequently than a predetermined value on the same day of the week and at the same hour as the present time, then such program channel is received if it is not being currently received, and the signal thereof is recorded automatically by a recording/playback unit which is incorporated in the receiving apparatus or is connected thereto via a control line and so forth. Consequently the user is enabled to watch or listen to the recorded program with certainty by reproducing the same later.

Furthermore, since the broadcast program of the frequent reception channel is automatically recorded, an advantageous effect is achieved in that such automatic recording can be performed even in the case in which the user is absent from home or the power switch is off, and a complicated presetting operation for reserved recording or the like is no longer necessary.

The above and other features and advantages of the present invention will become apparent from the following description which will be given with reference to the illustrative accompanying drawings.

BRIEF DESCRIPTION OF THE DRAWINGS

FIG. 1 is a block diagram of a preferred embodiment representing the broadcast receiving apparatus of the present invention;

FIG. 5 is a schematic diagram illustrating the channel history data of one day used in the embodiment of the broadcast receiving apparatus of the invention;

FIG. 6 is a schematic diagram illustrating the channel history data of three weeks relative to the same days thereof used in the embodiment of the broadcast receiving apparatus of the invention;

DESCRIPTION OF PREFERRED EMBODIMENTS

Figure 2A:
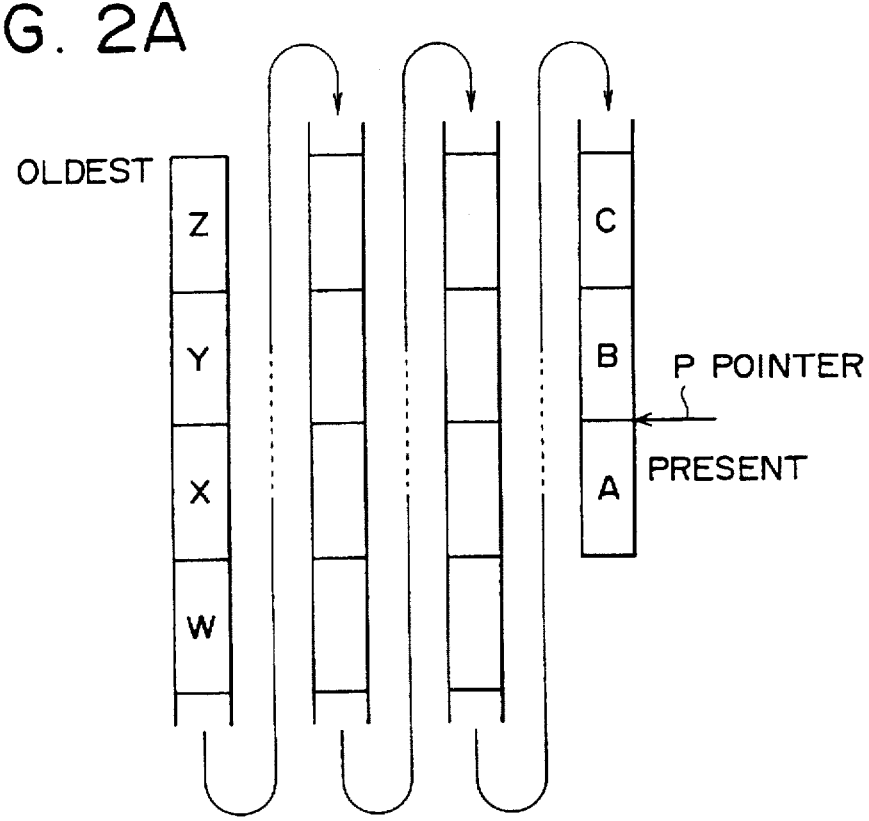
FIGS. 2A and 2B are schematic diagrams illustrating how to manage channel history data used in the embodiment of the broadcast receiving apparatus of the invention.

Hereinafter a preferred embodiment representing the broadcast receiving apparatus of the present invention will be described with reference to the accompanying drawings which show an exemplary television receiver adapted for ground-wave analog television broadcast.

FIG. 1 is a block diagram of one preferred embodiment representing such a television receiver. This television receiver has a picture-in-picture (hereinafter referred to as PinP) function capable of displaying a minor picture in a partial small area of an entire display screen, and incorporates a video recording/playback unit therein for recording a program on another different channel. Therefore, this television receiver has a double tuner construction in which it is equipped with two tuners. However, one of the tuners is used for displaying a picture on the PinP child screen and is also used as a video recording source. Accordingly, this television receiver does not have a function for switching parent and child screens in the PinP mode.

In the following description, the PinP and video recording signal lines will be explained as a sub system, while the other signal lines will be explained as a main system.

In FIG. 1, reference numerals 1M and 1S denote a main tuner and a sub tuner, respectively. Broadcast waves received by an antenna are distributed and supplied to the main tuner 1M and the sub tuner 1S. The tuners 1M and 1S serve to select desired channels in response to a channel selection control signal obtained from a control circuit 100 which is formed of an undermentioned microcomputer. In one case, the channel selection control signal is generated in the control circuit 100 in accordance with a user's selective manipulation of a remote commander or the like. And in another case, this signal is generated in the control circuit 100 itself regardless of the user's selective manipulation, as in an undermentioned mode of automatically recording a frequent reception program or for displaying such a frequent reception program on the PinP child screen.

The broadcast-wave signals of the channels selected by the tuners 1H and 1S are converted into video intermediate frequency (IF) signals and then are supplied to video IF amplifier/detector circuits 2M and 2S respectively. The IP signals are amplified in the circuits 2M and 2S, and further the video and audio signals are demodulated therein.

The demodulated video signal obtained from the video IF amplifier/detector circuit 2M is supplied to one input terminal TV of a switch circuit SW1, while the demodulated audio signal is supplied to one input terminal TV of a switch circuit SW3.

The demodulated video signal obtained from the video IF amplifier/detector circuit 2S is supplied as a video recording source to a video recording/playback unit 10 while being supplied also to one input terminal S of a switch circuit SW2. And the demodulated audio signal from the video IF amplifier/detector circuit 2S is supplied merely to the video recording/playback unit 10, because the sound relative to the child picture displayed in the PinP mode is generally not reproduced.

The reproduced video signal obtained from the video recording/playback unit 10 is supplied to the other input terminal VT of the switch circuit SW1 and the other input terminal VT of the switch circuit SW2. Meanwhile the reproduced audio signal from the video recording/playback unit 10 is supplied to the other input terminal VT of the switch circuit SW3.

The switch circuits SW1, SW2 and SW3 are selectively changed in response to a switching signal outputted from a control circuit 100. The switch circuits SW1 and SW3 serve to select either the signal from the main tuner 1M or the reproduced signal from the video recording/playback unit 10, and a switching signal to the two circuits SW1 and SW3 is common.

More specifically, in response a user's selective actuation of an undermentioned remote commander for watching the broadcast program of the channel selected by the main tuner 1M, each of the switch circuits SW1 and SW3 is changed to connect one input terminal TV thereof, whereby the video recording/playback unit 10 is placed in a playback mode. And in response to a user s selective actuation for watching and listening the reproduced video signal and audio signal, each of the switch circuits SW1 and SW3 is changed to connect the other input terminal VT thereof.

The switch circuit SW2 serves to select either the video signal of the program selected by the sub tuner 1S to be displayed on the PinP child screen, or the reproduced video signal outputted from the video recording/playback unit 10. When the video signal obtained from the sub tuner to be displayed on the PinP child screen is selected by the user, the switch circuit SW2 is changed to connect its one input terminal S; and when the reproduced video signal from the recording/playback unit 10 is desired, the switch circuit SW2 is changed to connect the other input terminal VT thereof.

The video signal obtained from the switch circuit SW1 is supplied via a video signal processing circuit 3M to a PinP composite circuit 4. Meanwhile the video signal obtained from the switch circuit SW2 is supplied via a video signal processing circuit 3S to the PinP composite circuit 4. In the video signal processing circuit 3S, the picture size of the input video signal is so compressed as to be suitably displayed on the PinP child screen.

When a PinP display operation is performed, a control signal is supplied from the control circuit 100 to the PinP composite circuit 4, and the video signal outputted from the video signal processing circuit 3S is composited to be superimposed as a child picture. However, when such a PinP display operation is not performed, the video signal obtained from the video signal processing circuit 3M is outputted as it is through the PinP composite circuit 4.

The video signal from the PinP composite circuit 4 is supplied to a superimpose display processing circuit 5. This circuit 5 is supplied with a signal denoting a character, figure, pattern or the like as will be described later, and a process of displaying an alarm mark or the like in a superimposed state on the screen is executed in response to the control signal supplied from the control circuit 100 to the superimpose display processing circuit 5. The signal to be superimposed on the picture is generated in accordance with the operation of the control circuit 100, as will be mentioned later.

In this embodiment, the video signal from the superimpose display processing circuit 5 is supplied to a CRT display device 6, so that there are displayed, on its screen, color pictures of the broadcast programs received by the tuners 1M and 1S or color pictures composed of the reproduced signal from the video recording/playback unit 10.

The audio signal obtained from the switch circuit SW3 is supplied via an audio processing circuit 7 to an audio amplifier 8 and then is reproduced by a loudspeaker 9. In this embodiment, the volume and tone of the sound to be reproduced are controlled in the audio amplifier 8 by the control signal from the control circuit 100.

The video recording/playback unit 10 employed in this embodiment is structurally similar to a video tape recorder using an 8-mm magnetic video tape or the like as a recording medium. Since its structure is well known, an explanation thereof is omitted here.

Now the control circuit 100 will be described in detail below. The television receiver of this embodiment is so constructed that, when a main power switch is turned on in a state where the television receiver is connected to an AC outlet socket, its power on/off control can be executed by manipulation of a remote commander. And during an on-state of the main power switch, the control circuit 100 is kept in an operable condition.

As mentioned, the control circuit 100 is equipped with a microcomputer, wherein a CPU 101, a ROH 103, a DRAM 104 and an SRAM 105 are connected to a system bus 102. Further I/O ports 111 to 117 are connected also to the system bus 102 so that various signals can be inputted or outputted therethrough.

For example, a channel selection control signal is supplied via the I/O port 111 to the main tuner 1M and the sub tuner 1S. Meanwhile a control command for starting or stopping a recording or playback operation is supplied from the control circuit 100 via the I/O port 112 to the video recording/playback unit 10, or a mode status signal is delivered from the video recording/playback unit 10 via the I/O port 112 to the control circuit 100. And a switch control signal to any of the switch circuits SW1, SW2 and SW3 is supplied from the I/O port 113.

Reference numeral 11 denotes a clock circuit which indicates the present time and, in this embodiment, as will be described later, it serves also as a timer to generate an interrupt timing signal when the CPU 101 executes an interrupt process. A source voltage is applied continuously to the clock circuit 11 even when the power switch of the television receiver is at its off-position. In this embodiment, although not shown, the voltage to the clock circuit 11 is supplied from a separate power source such as an ordinary or rechargeable battery. The time data and the timer data obtained from this clock circuit 11 are delivered via the I/O port 114 to the system bus 102.

The time of the clock circuit 11 can be corrected by execution of a program in the CPU 101. The clock circuit 11 further has date (of year, month, day, and day of week) in addition to the time data (of hour, minute and second). In this embodiment, however, the data relative merely to day of week and time are sufficient as time parameters which are used correspondingly to undermentioned channel history data.

In this specification, channel history data signifies the status of selection of program channels by the tuner 1M stored in a memory (undermentioned SRAM 105), e.g., the data that represents the channel number selected by the tuner 1M on a certain day of week and at a certain hour in the past. In this embodiment, the channel history data covers a plurality of weeks.

Control signals are supplied to the PinP composite circuit 4 and the amplifier 8 via the I/O port 115.

A work signal for determining whether or not to execute a superimpose display is supplied via the I/O port 116 to the superimpose display processor 5. The content of such superimpose display includes, for example, a channel number indicative of the channel selected at the channel change time, the channel being received now, a bar indicating the level of the adjusted sound volume, or a message which will be described later.

For executing such superimpose display, a video RAM 12 is connected to the system bus 102. In the video RAM 12, there are once stored character data and symbol data formed in the control circuit 100 by the use of character data recorded in the ROM 103, and the desired data is supplied via a display controller 13 to a superimpose display processor 5 in accordance with program control of the CPU 101 so as to be used for superimpose display on the screen.

In this case, font data and image data of characters and symbols required for superimpose display are stored in the ROM 103. Such font data and image data of the required characters and symbols are read out by the CPU 101 and then are transferred to arbitrary addresses in the video RAM 12, from which the data are supplied via the display controller 13 to the superimpose display controller 5, where the image data from the video RAM and the video signal are composited and then are displayed on the screen of the CRT display device 6 for an adequate period of time.

In the superimpose display mode, an image superimposed through an overlay process is displayed on the screen of the CRT display device 6.

In the television receiver of this embodiment, various control actions are performed wirelessly by manipulation of a remote commander 14. When an infrared remote control signal for example is generated from this remote commander 14, this signal is received by a remote control signal receiver/decoder 15 in the television receiver, wherein the remote control signal thus received is decoded and then is supplied via the I/O port 117 to the system bus 102.

Subsequently the CPU 101 interprets the remote control signal thus inputted via the I/O port 117, and executes its control action with regard to program channel selection, sound volume, PinP composite, superimpose display, selective change of the switches SW1-SW3, or operation mode of the video recording/playback unit 10.

The DRAM 104 is used principally as a work area for calculation and so forth. Meanwhile the SRAM 105 has a last memory function for storage of the channel and the sound volume in response to an on/off action of the power switch and is used as a recording area for holding undermentioned channel history data. In this embodiment, the SRAM 105 has a structure of a nonvolatile memory where its power supply is backed up with a battery. Therefore, even if the television receiver is in a power-off state, the SRAM 105 is always backed up so that its content is never erased.

[First embodiment of processing to generate channel history data]

In this embodiment, the status of channel selection of the main tuner 1M is sampled at a predetermined time interval, and the selected program channel at each sampling point is written in the SRAM 105, whereby channel history data is stored therein.

In the case of this embodiment, an interrupt process is executed at a predetermined time interval in accordance with the timer data obtained from the clock circuit 11, and after the main tuner 1M is searched with respect to the status of program channel selection thereof, such program channel selection status of the tuner 1M at that time point is stored in the SRAM 105.

In the channel history data generating method of this embodiment, the CPU 101 executes an interrupt process at a fixed time interval, so that if the start time point is known as absolute time data, it becomes possible to find the time at each sampling point on the basis of the lapse therefrom. Consequently, it is not necessary to store the time data at each sampling point in the SRAM 105.

Figure 2B:
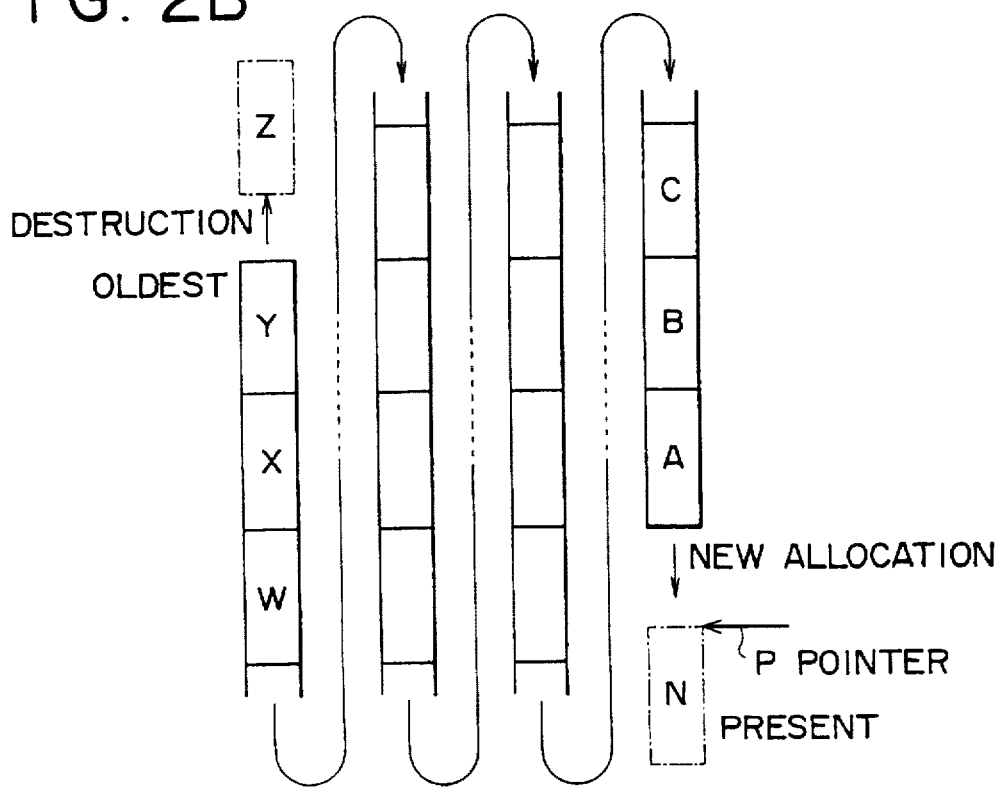
Figure 3:
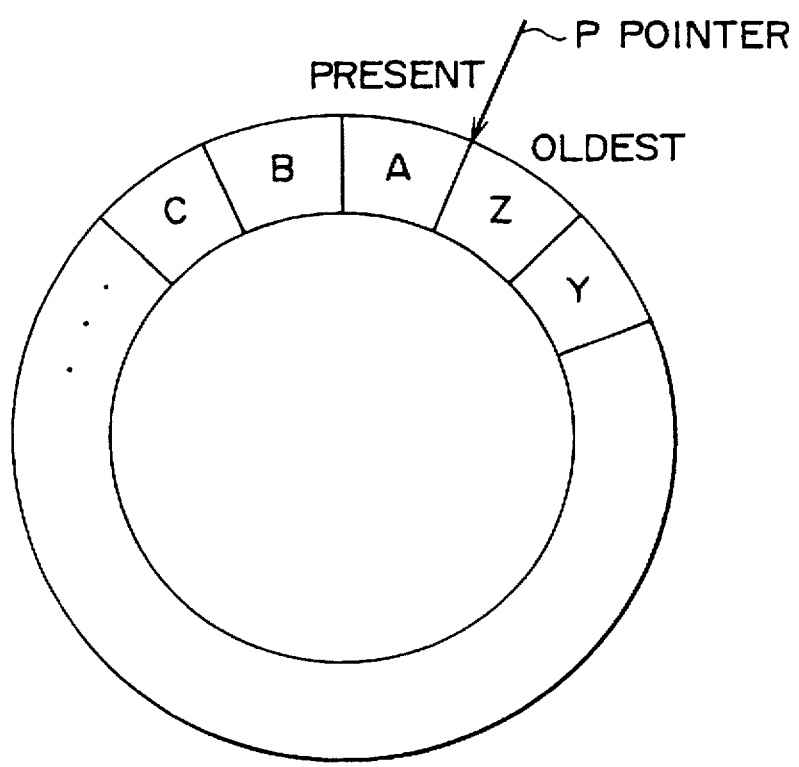
FIG. 3 is another schematic diagram illustrating how to manage the channel history data used in the embodiment of the broadcast receiving apparatus of the invention.

FIGS. 2A, 2B and 3 are image diagrams showing how to manage the channel history data in the above case. More specifically, the memory areas in the SRAM 105 for storage of the channel history data are illustrated as images in the diagrams. In each of FIGS. 2A, 2B and 3, an arrow denotes the position of a pointer P. The pointer P indicates the memory area being currently used at the present time. As illustrated in FIG. 3, the memory areas in the SRAM 105 for channel history data are managed as a ring structure imagewise.

This embodiment is so contrived that channel history data of n weeks (where n is an integer 2 or greater) anterior to the present time point are always stored in the SRAM 105, and the latest channel history data are successively stored in sequence while the old data anterior by more than n weeks are destroyed.

More specifically, the tuner 1M is scanned at an interval of ten minutes for example to acquire a channel history, and the channel history data thus obtained are managed by successive address spaces at an interval of ten minutes, as shown in FIG. 2A. And when the memory areas of the ring structure illustrated in FIG. 3 are filled with the data, the oldest channel history data is destroyed as shown in FIG. 2B, while the present channel history data newly inputted is stored in the memory.

In this case, the channel history data stored in the SRAM 105 are those of at least a plurality of weeks, as described already. And the CPU 101 is capable of managing such channel history data in the SRAM 105 per day of week. If the sampling is performed at an interval of 10 minutes, 144-fold data thereof correspond to one day, and 7-fold data thereof correspond to one week, so that the entire channel history data can be managed with simplicity merely by counting the number of such data.

In this case, input of channel history data by the aforementioned interrupt process is begun at the actual start time of each program as xx:01, xx:11, xx:21, xx:31 or the like.

Prior to storage of channel history data into the data memory area of the SRAM 105, this area is initialized or cleared. And simultaneously the position of the history storage pointer is also initialized. Since the past history data are cleared by such initialization, setting of the initialization is performed, in a television receiver for example, together with allocation of remote control buttons to program channels, or with registration of the present time in the clock circuit 11.

Here the allocation of remote control buttons to program channels signifies a user's operation of allocating specific channels of remote control buttons to program channels (broadcast stations). Such setting of channels and so forth are performed generally at the time of purchase of the television receiver, but may be executed by the user as well.

In this embodiment, a channel history reset button is provided on the remote commander 14, and the content of the channel history area in the SRAM 105 can be initialized in the same manner as mentioned by pressing the reset button. The provision of this reset button is derived from the fact that, since the contents of television broadcast programs in Japan are widely changed in spring and fall, it is necessary that the past channel history data be reset by the user at such seasonal changes of programs so as to prevent erroneous selection of any wrong channel as a frequent reception channel due to the past history anterior to changes of programs.

Figure 4:
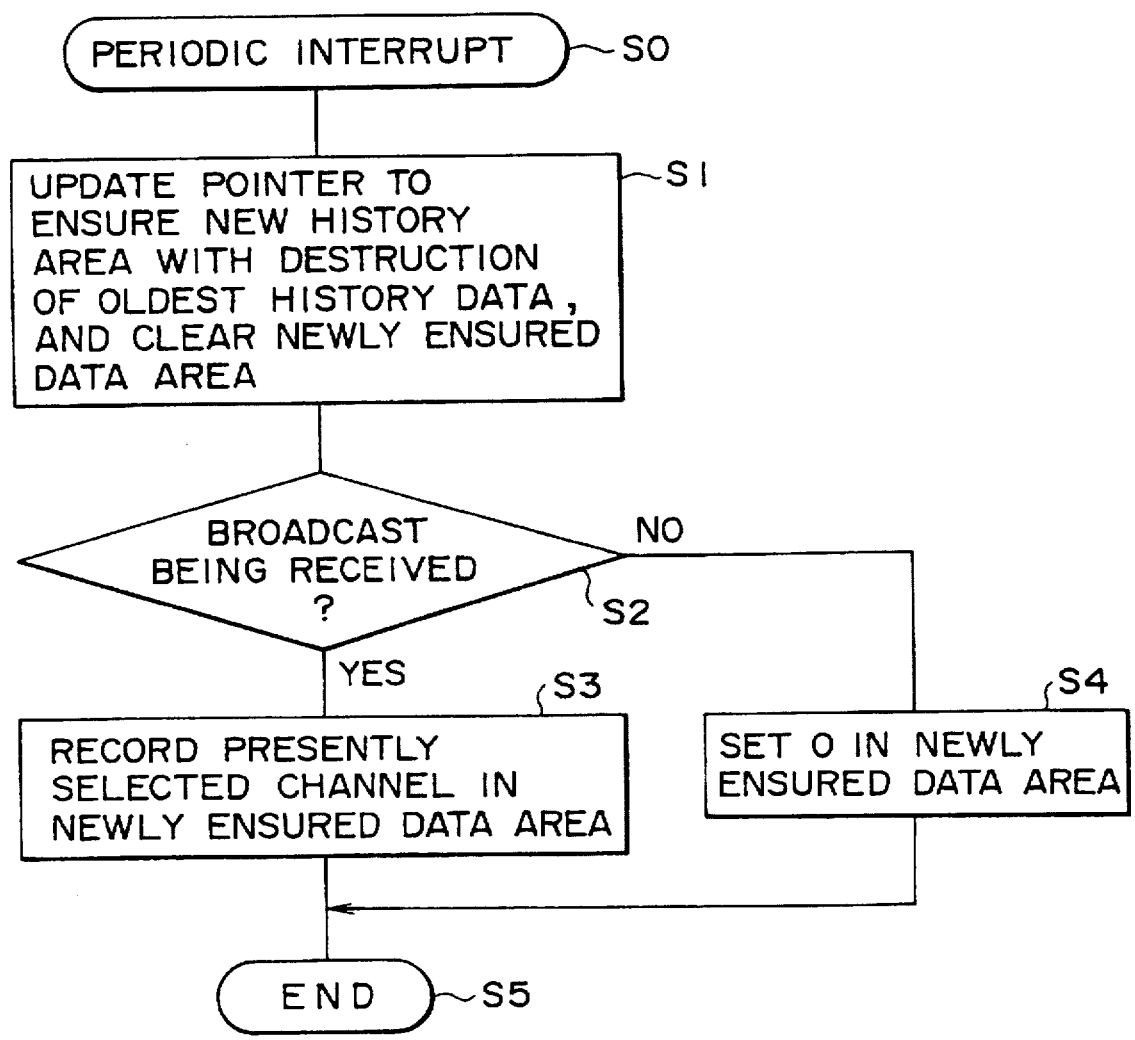
FIG. 4 is a flow chart showing a procedure of storing the channel history data used in the embodiment of the broadcast apparatus of the invention.

Hereinafter an operation of recording the channel history in this embodiment will be described with reference to a flow chart of FIG. 4.

In this embodiment, when an interrupt is executed periodically (step S0) at a time interval of 10 minutes during a practical broadcast as mentioned above, a routine for acquiring the relevant channel history data is started.

Subsequently at next step S1, a pointer is updated in the channel history memory space of the SRAM 105. Updating the pointer ensures a new data area, and a process of null clearing the newly ensured data area (to 0) is also executed at step S1. In this example, the channel history memory areas in the SRAM 105 are managed like a ring as mentioned, so that when the ring-shaped channel history data areas have been filled completely with the data, it follows that the process of updating the pointer is executed with concomitant destruction of the oldest channel history data.

In case the address of the new data area ensured as a result of updating the pointer exceeds the last address of the ring-shaped memory areas, the pointer is reset to the top address.

During an on-state of the main power switch of the television receiver, an interrupt is started at step S0 periodically at a time interval of 10 minutes in this embodiment. However, during an off-state of the main power switch of the television receiver, there is started no interrupt into the processing routine of FIG. 4. In this embodiment where the clock circuit 11 is driven by another separate power supply, the time data obtained from such separate power supply is used at step S1, and a process of updating the channel history area, which is to be executed during an off-time of the main power supply, is executed at the timing of a first interrupt after the next turn-on of the main power supply.

More specifically, this embodiment is so contrived that the timing data of the interrupt executed immediately before turn-off of the main power switch is held in the SRAM 105. And upon arrival of timing of a next interrupt after subsequent turn-on of the main power switch of the television receiver, the number of interrupts to be executed during such period is detected with reference to the timing data of the interrupt executed immediately before turn-off of the main power switch and stored in the SRAM 105. Then the pointer is updated correspondingly to the detected number of the interrupts, and the areas of the entire updated data are null-cleared. And the data are updated to the area corresponding to the interrupt at the present time point.

After termination of the process for updating the pointer and ensuring a new data area as mentioned, the operation proceeds to step S2 where a decision is made as to whether any broadcast is now being received or not. That is, if the video recording/playback unit 10 is in a playback mode and the output therefrom is being watched, it is not regarded here as reception of television.

When the result of the above decision signifies reception of a broadcast, the operation proceeds from step S2 to step S3, where the data of the program channel being selected at that time by the tuner 1M is stored in the newly ensured data area. The content of the program channel data stored in this manner may be the channel number or the channel selection control data supplied to the tuner 1M.

Meanwhile, if the result of the decision at step S2 signifies no reception of any broadcast, the operation proceeds to step S4 where "0" is set in the newly ensured data area. In this example, also when the main power supply to the television receiver is off due to the process executed at step S1 during the off-state of the main power switch of the television receiver, "0" is held in the channel history data area similarly to the above, and this state is also regarded as no reception of any television broadcast.

After termination of the process at step S3 or S4, this routine is completed at step S5.

Thus, in this embodiment, the data of the broadcast program channel received at each time point is stored as a new history at an interval of 10 minutes in the channel history area of the SRAM 105 which covers a plurality of weeks. And when the channel history areas of plural weeks are filled with the data as described, new channel history data are sequentially written therein while the old history data are destroyed correspondingly.

FIGS. 5 and 6 show channel history data of one day and three weeks, respectively, in the form of a table. In this example, data of a program channel number is stored in each channel history data area Dch. The time shown on the left of each data area Dch indicates the input time of the channel history data, and in this example, such time need not be stored in the data area Dch as described.

In referring to the channel history data for making a decision as to whether an undermentioned frequent reception channel exists, it is judged in this embodiment that a high probability of receiving the relevant channel is attained at the points anterior and posterior to the input time of the channel history data. The interval between such time points anterior and posterior to the input time of the channel history data is ±5 minutes when the channel history data input interval is 10 minutes as in the aforementioned case.

In this embodiment where channel history data are updated at an interval of 10 minutes, a total of 6×24=144 history data are stored per day. It follows therefore that a total of 144×7=1008 history data are recorded per week. Supposing now that one channel history data has a length of 1 byte, the total data per week has a length of 1008 bytes. Since it is necessary to acquire history data of plural weeks as mentioned, memory areas equivalent to an integral multiple of 1008 bytes are set as channel history areas in the SRAM 105.

As described, the table of channel history data in this embodiment is such as shown in Pigs. 5 and 6, where the numbers of history data per day and week are predetermined. Therefore, if the data area having a certain temporal relationship as one week ago or two weeks ago from the present time point can be found, it is possible to obtain with facility the channel history data at the same hour in the past. Accordingly, the absolute time data indicating the input hour of each history data is not required as the channel history data to be stored in the SRAM 105. However, it is necessary that the absolute hour be set in the clock circuit 11 because, in checking the presence or absence of any frequent reception channel, the channel history is referred to the channel history data table on the basis of the hour indicated by the clock circuit 11.

Therefore, when the present hour is set again in the clock circuit 11, both the channel history memory (channel history table) and the pointer thereof are initialized as mentioned, since the interrupt timer data is obtained also from the clock circuit 11.

In the embodiment described above, the pointer is updated in a unit of a fixed amount in accordance with the lapse of time, so that during an off-state of the main power supply of the television receiver, the processes of updating the pointer and null-clearing the data area are repeated as mentioned. Therefore, the memory area can be economized by first detecting the number of interrupts, which are to be executed during the off-state of the main power supply of the television receiver, at the next turn-on of the main power supply after the preceding turn-off of the main power switch, and then recording, in the channel history memory area, a code which represents succession of null data corresponding to the detected number, such as "FF" in hexadecimal notation (where  denotes the number of null data). More specifically, if the main power supply is switched off during a period from 22:00 to 07:00 on the next day, the number of interrupts to be executed during this period amounts to 54. Then, the memory area can be economized by storing data "FF54" instead of storing data FF 54 times.

Although in the above embodiment the channel history data is acquired at an interval of 10 minutes, such interval may be 15 or 30 minutes as well. And in case the memory area for storing the channel history data is sufficiently large, the interval may be 1 minute or 5 minutes also. However, since the unit broadcast time of each program is usually 30 or 60 minutes, it is preferred that any odd interval of 8 or 9 minutes, which causes some remainder in dividing each unit broadcast time, should be avoided in periodical acquisition of channel history data.

The interval of acquiring channel history data is not limited merely to a fixed length alone. For example, channel history data may be acquired in a short-interval cycle during a so-called prime time zone where a high audience rating is expected in general, and the acquisition of such data may be executed in a long-interval cycle during any other time zone.

[Processing for frequent reception channel in first embodiment]

Hereinafter an explanation will be given on the processing executed in the first embodiment with regard to a frequent reception program by the use of channel history data.

In this case, the past channel history is checked at the timing different from the aforementioned timing of acquiring the channel history data, and a search is made as to whether there exists any frequent reception program channel or not. Here, adoption of the different timing is based on the the following reason. It is preferred that the aforementioned channel history data acquisition be started at the time after actual beginning of the program, but when an adequate process is to be executed after checking the past history, it is preferred that this process be started simultaneously with or immediately before the actual beginning of the relevant program.

More specifically, the acquisition of channel history data is started at xx:01, xx:11, xx:21, xx:31 or the like which is the time after actual beginning of the program. In contrast therewith, the following process that uses the past history is started at xx:00, xx:10, xx:20, xx:30 or at xx:29, xx:59 or the like which is the beginning time of the program or immediately before such time and is adequate to start or end the desired video recording.

In this embodiment, despite the existence of any program channel received frequently in the past, a priority is given to a reserved program when a video recording operation is being performed in a reserved recording mode or when the television receiver is placed in a reserved hour wait state by a video recording reservation. Therefore, in this embodiment where the video recording/playback unit 10 consists of a VTR using a magnetic tape as a recording medium, the process to be described below is not started in case any video recording reservation has already been preset. And the embodiment is so contrived that, after completion of recording the content of the reserved program, the content thus recorded is not erased by overwriting in an undermentioned automatic video recording mode (which automatically records the frequent reception channel when such channel is existent).

This process is not started either when any recordable empty area is not present in the recording medium loaded in the video recording/playback unit 10.

Figure 7A:
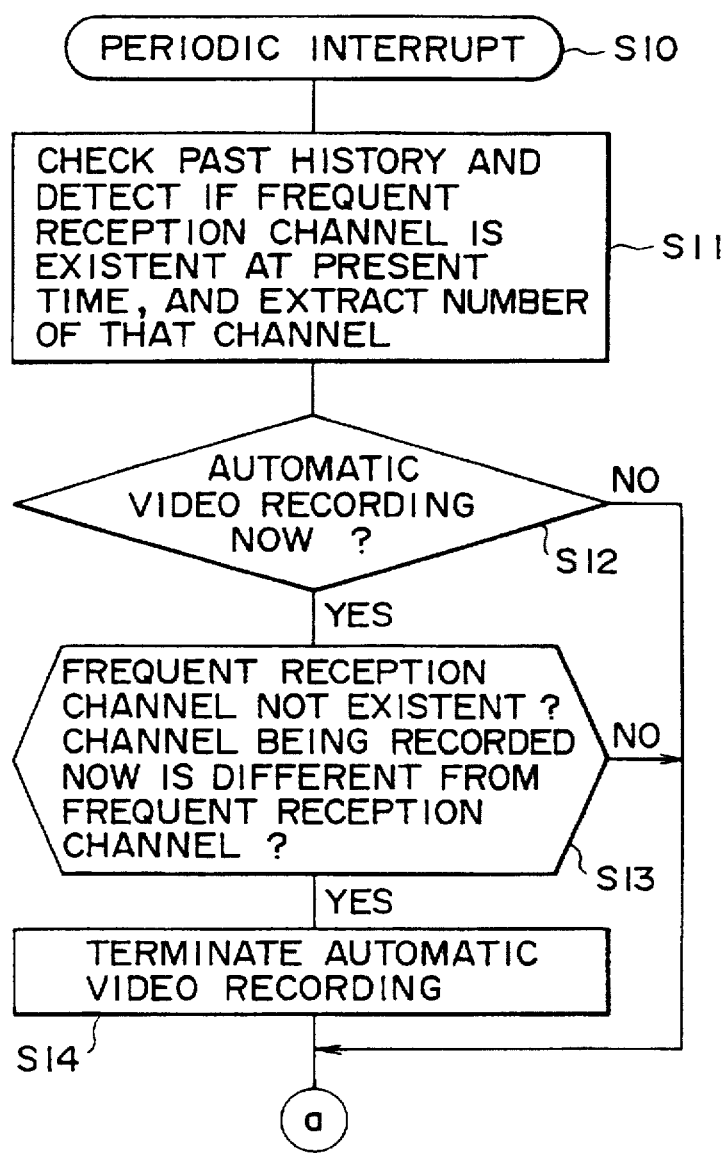
FIGS. 7, 7A and 7B are flow charts illustrating an operation of automatically video-recording a frequent reception channel in the embodiment of the broadcast receiving apparatus of the invention.
Figure 7:
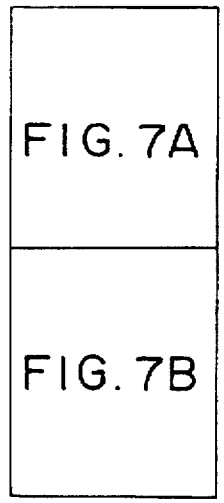
Figure 7B:
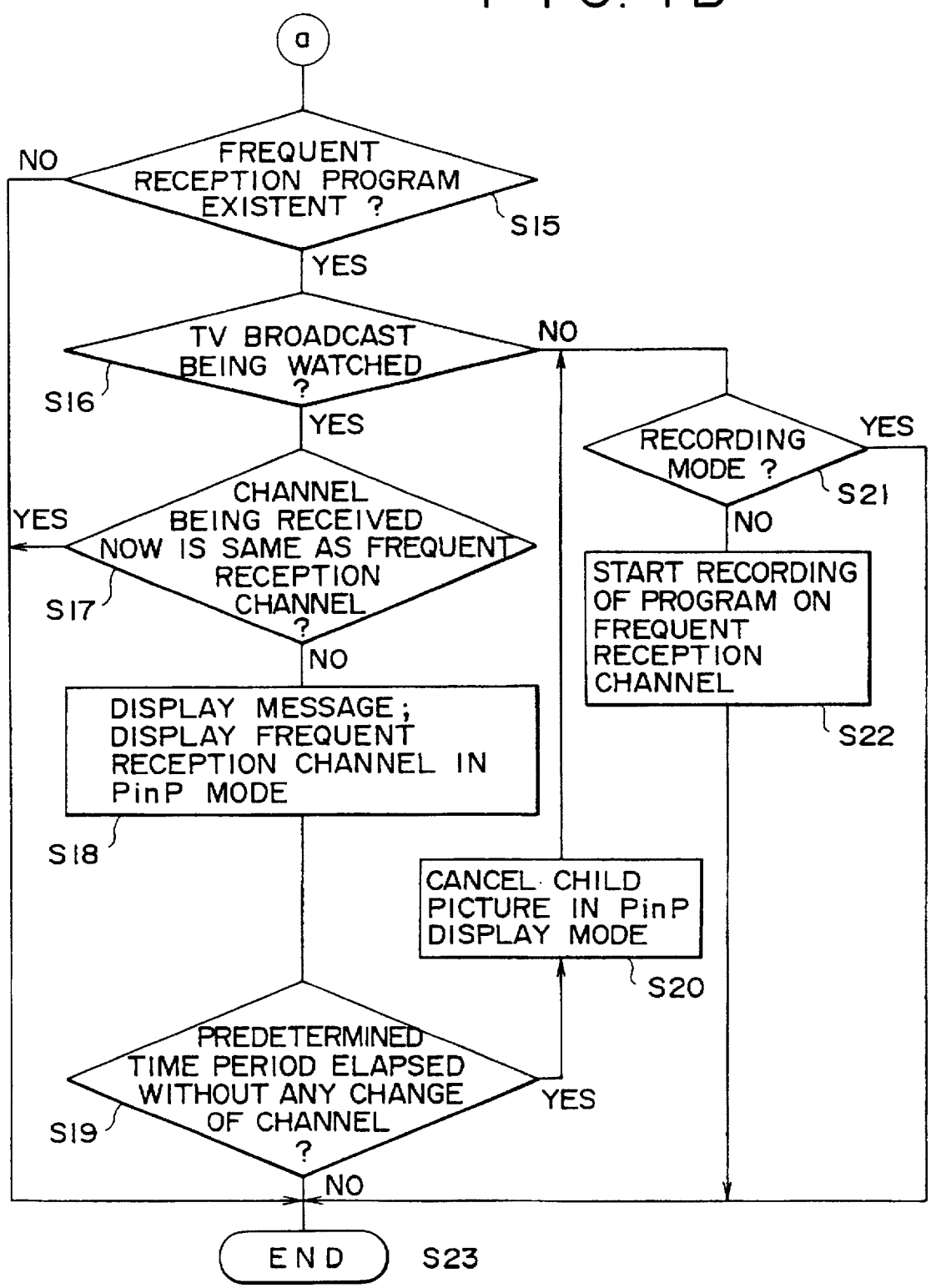

Referring now to a flow chart of FIG. 7, an explanation will be given on a processing routine to perform automatic video recording after summing up the past history by the use of channel history data.

First, when a fixed-period interrupt is executed (step S10) at a timing different from the channel history acquisition timing as mentioned, this processing routine is started.

Then the operation proceeds to step S11, where the past channel history relative to the same day of week and the same hour as those at the present time point is checked with reference to the channel history data table stored in the SRAM 105. And there is extracted the data which represents the existence or nonexistence of any program channel usually watched at the same hour (i.e., frequent reception channel) and also represents the number of that program channel.

The existence or nonexistence of any frequent reception channel is determined on the basis of whether the frequency of the reception has exceeded a preset frequency threshold value or not. Here, a frequent reception channel signifies a channel watched more frequently than a predetermined percent in the past inclusive of both power-on and power-off states of the television receiver, and the influence of the history during the power-off state is eliminated to the maximal extent. In this embodiment, when no broadcast was received during the power-off state of the television receiver at the relevant hour in the past, the result is set to zero, but this result is also used as data in counting the reception frequency.

In an exemplary case where channel history data of the past three weeks is stored and preserved, if there is any channel received and watched in the two weeks successively, such a channel is regarded as a frequent reception channel. Meanwhile, even if the history indicates selection of a certain channel once though no television broadcast is watched usually, it is not regarded as a frequent reception channel.

In view of judging a frequent reception channel from the past history in this manner, it is convenient that the size of the channel history data memory area set in the SRAM 105 has a capacity not in excess of the broadcast program replanning period. In the Japanese broadcast stations, it is customary that one year is divided into four cours, and broadcast programs are replanned in each of them, so that a history of three months is a preferred maximum to be inputted as past data into the SRAM 105.

Subsequently the operation proceeds from step S1 to step S12, where a decision is made as to whether automatic video recording is being performed or not in the video recording/playback unit 10 of the television receiver. It is to be understood here that the term automatic video recording means video recording of a frequent reception channel which is watched usually, and does not mean reserved video recording which records a program at the specific hour preset by a user.

If the result of the decision at step S12 is negative, the operation proceeds to step S15. Meanwhile, when the result of this decision signifies that automatic video recording is being performed, the operation proceeds to step S13, where a check is made with reference to the result of checking the channel history data at step S11, so as to find whether none of frequent reception channels is existent at the present time point or, even if any frequent reception channel is existent, whether it is different or not from the channel being now recorded automatically.

When the result obtained at step S13 is negative to signify neither case, the frequent reception channel being now recorded automatically is regarded as a past frequent reception channel at the interrupt timing as well, so that the automatic video recording is kept on continuously, and the operation proceeds to step S15.

If the result of the check at step S13 signifies that none of frequent reception channels is existent at the present time point or any frequent reception channel detected from the history table is different from the channel being now recorded automatically, the operation proceeds to step S14 to terminate the automatic recording in the video recording/playback unit 10. And then the operation proceeds to step S15.

With reference to the result of the check executed at step S11 on the basis of the channel history data in the SRAM 105, a decision is made at step S15 as to whether there exists any frequent reception channel usually watched in the past at the same hour. And when the result of this decision is negative, the operation further proceeds from step S23 to complete this processing routine.

Now an exemplary case of detecting a frequent reception channel from the past history at step S15 will be described below with reference to the channel history table of FIG. 6. As mentioned, this example represents a case where history data of three weeks are stored, and reference is made to the past reception history relative to the same day of week and the same hour as those at the interrupt start timing in the flow chart of FIG. 7. And if any program channel received in the past more frequently than a predetermined percent is existent on the same day of week and at the same hour, such channel is regarded as a frequent reception channel.

Therefore, in an example of 00:21 shown in FIG. 6, "0" indicating no reception of any broadcast program is existent in the data of two weeks, and Channel 10 was watched two weeks ago, so that this is the channel received most frequently in this example. However, since the reception frequency thereof is lower than ⅓, this channel is not regarded as a frequent reception channel which is the one usually watched.

Meanwhile, in another example where the present time is 19:01, Channel 12 was selected in each of three weeks, so that this is regarded as a frequent reception channel. In this manner, the definition of a frequent reception channel does not exactly mean a channel watched every week, i.e., at a rate of 100 percent, but any channel watched at a high rate above, e.g., ⅔ (66 percent).

If the result of the decision at step S15 signifies the existence of any frequent reception channel, the operation proceeds to step S16, where a check is made as to whether the television receiver is switched on and a broadcast program is being received. And when the result of this check signifies reception of a broadcast program, the operation proceeds to step S17 to further check if the program channel being received now is the same as the frequent reception channel detected at step S15.

In the case of the same channel, the operation further proceeds from step S23 to complete this processing routine. Meanwhile, if the result of the check at step S17 is negative to signify that the channels are mutually different, the operation proceeds to step S18 to display a message for arousing a user s attention with characters such as "Usually you watch channel A now" or with a graphic symbol such as an icon to indicate the existence of some other frequent reception channel.

And simultaneously the control circuit 100 supplies a channel selection control signal to the sub tuner 1S for selecting the frequent reception channel, whereby the video content received on this frequent reception channel is displayed as a PinP child picture for a fixed period of time on the display device. That is, the picture of the frequent reception channel usually watched is displayed for a fixed period of time in the PinP display mode.

The user is thus enabled to know the existence of the usually watched program on the other channel by the message represented visually with characters or a graphic symbol on the display device, and further to know the content of the program on the PinP child screen.

Thereafter the operation proceeds to step S19, where a decision is made as to whether a predetermined period of time has elapsed or not without any manipulation by the user to select the frequent reception channel. In case the user has selected the frequent reception channel by changing the channel being received now through the main tuner 1M, the operation further proceeds from step S23 to complete this processing routine. The PinP display mode can be canceled at any time by the user.

Meanwhile, if the channel is not changed by the user even after the lapse of a predetermined period of time, the child picture in the PinP display mode is canceled, and then the operation proceeds to step S21. And when the result of the decision at step S16 signifies no reception of any television broadcast despite the presence of a frequent reception channel, the operation proceeds to step S21 also.

Subsequently at step S21, a decision is made as to whether the video recording/playback unit 10 is in a recording mode or not. More specifically, a check is made to detect whether automatic video recording of the frequent reception channel is started, or the reserved program is being recorded in the video recording/playback unit 10, or the unit 10 is placed in a recording state by a forced manipulation of the user.

If the video recording/playback unit 10 is in a recording state, a priority is given to this recording state, and the operation jumps from step S21 to step S23 to thereby complete this processing routine. When the result of the decision at step S21 is negative to signify no recording state, the frequent reception channel detected at step S15 begins to be recorded in the video recording/playback unit 10. The video recording source in this case is the sub tuner is as mentioned. Therefore, even when the television receiver is switched off, power is supplied properly to the sub tuner 1S, the video IF amplifier/detector circuit 2S and the video recording/playback unit 10 to perform video recording, although no power is supplied to the display device.

Figure 8:
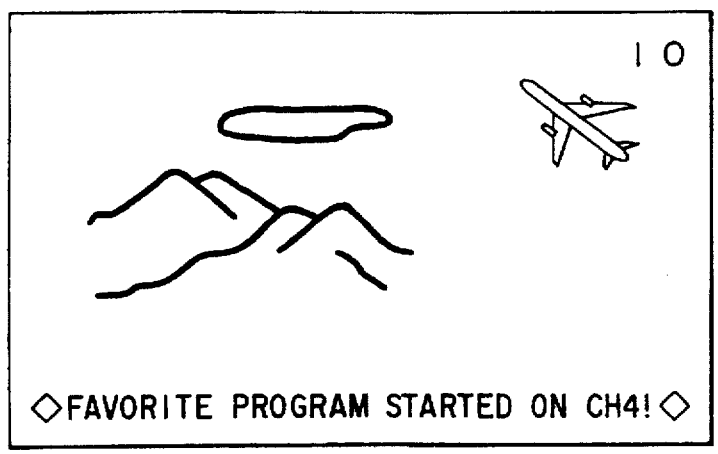
FIG. 8 shows an exemplary message displayed on a screen in the embodiment of the broadcast receiving apparatus of the invention.
Figure 9:
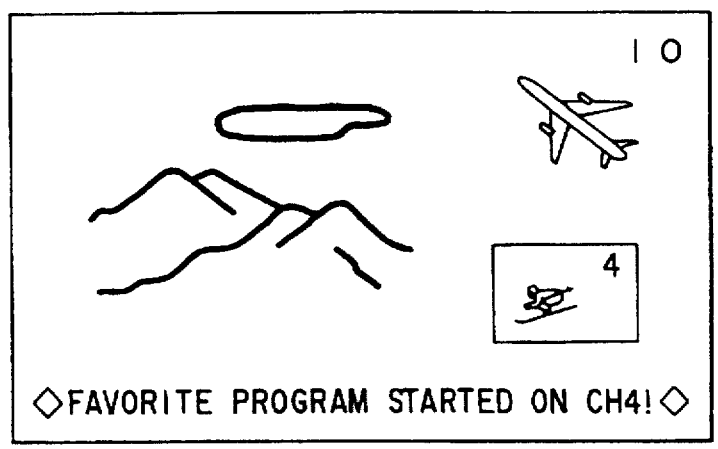
FIG. 9 shows an example of pictures displayed on the screen in the embodiment of the broadcast receiving apparatus of the invention.

FIG. 8 shows an exemplary message displayed at step S18. This example represents a case where a message is displayed during reception of Channel 10 so as to arouse a user's attention to that a frequent reception channel (favorite program on Channel 4) is usually watched at the same hour. And FIG. 9 shows another exemplary message and an exemplary PinP child picture displayed at step S18, wherein the favorite program content of Channel 4, which corresponds to the frequent reception channel in FIG. 8, is displayed on the PinP child screen.

Figure 10:
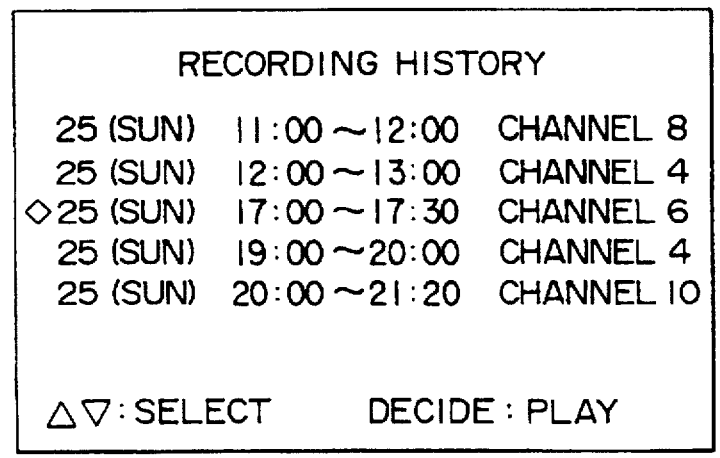
FIG. 10 shows exemplary contents of an automatically recorded history displayed on the screen in the embodiment of the broadcast receiving apparatus of the invention.

When automatic video recording is performed in the manner described above, the CPU 101 stores the history of such automatic video recording in the SRAM 105 and reads out the history therefrom at a desired time later to display the content of the video recording history, as shown in FIG. 10.

More specifically, the CPU 101 successively stores the start time and end time of the automatic video recording and also the channel data thereof in the SRAM 105. And when a recording history call button of the remote commander for example is actuated by the user, the stored history data is retrieved and displayed on the screen, as shown in FIG. 10. Then the user selects desired one of the recorded contents from the displayed data in FIG. 10 by actuating an up/down cursor key of the remote commander and reproduces the desired program to enjoy the same.

In each of the embodiments mentioned above, any channel selected once is recorded directly as frequency 1. However, depending on the user's preference, frequency data may be weighted with respect to particularly favorite programs. For the purpose of weighting frequency data, a weighting button may be provided on the remote commander to enable the user to weight the channels which are to be received.

In the case of undermentioned digital television broadcast, reception frequencies may also be weighted in accordance with the program selection tendency of the user in selecting a desired program from a menu. For example, when the user tends to select news or dramas, reception frequency data may be so weighted that one selection of news or drama is doubled or rendered equal to two selections in a channel history.

Also in the above embodiment, a VTR is employed as the video recording/playback unit 10. However, it may be so modified that an A–D converter is provided on the input side of the video recording/playback unit 10 and a D–A converter is provided on the output side thereof, whereby signals are recorded as digital data on a magneto-optical disk. In this case where both video and audio signals are recorded on a disk and are reproduced therefrom, the recording contents are not stored sequentially, so that the automatic recording can be kept on continuously while overwriting is inhibited merely with regard to the portion recorded in a reserved recording mode.

Therefore, differing from the aforementioned case where a VTR is employed as the video recording/playback unit 10, it is neither necessary to execute a process of not performing automatic video recording in response to preset of reserved video recording, nor necessary to wait for termination of the video recording.

When a disk is used as a recording medium and no empty area is left any more on the disk, it is possible to adopt a means not to perform recording as described, or a means to overwrite signals on the area already recorded. According to the former means, however, there may occur a case where the most favorite or desired program to be recorded is rendered unrecordable after a sufficient capacity is no longer left on the recording medium. Meanwhile according to the latter means, if automatic recording is performed posterior to the recording of the most favorite or desired program, the recorded content thereof may be erased by such automatic recording.

In order to solve the above problem, prior to an automatic recording operation, there is executed a process of comparing the reception frequency of the automatically recorded preceding program with the reception frequency of the program to be recorded now, and a decision is made with regard to overwriting in such a manner as to leave the program of the higher reception frequency. In this constitution, it becomes possible to achieve satisfactory recording that meets the requirements of the user, hence offering remarkable convenience.

Although depending on the capacity of each recording medium, the recording capacity can be economized, in case the capacity is small, by limiting the range of an automatic recording time merely to night or day alone, or by switching on/off each automatic recording by actuation of a button or he like.

In the embodiment mentioned above, the video recording/playback unit is incorporated in the television receiver. However, the recording/playback unit may be an external one as well in a modification where the television receiver is equipped with a VTR connector jack having a control signal terminal, and both a video recording command and a channel selection control signal for selecting a frequent reception channel are supplied from the control circuit 100 of the television receiver to the VTR connected to such jack. In another modification, the television receiver may be equipped with an IR emitter which generates a remote control signal for the VTR, and a channel selection command and a video recording command are transmitted with infrared rays to the VTR via the IR emitter.

[Second embodiment for processing generation of channel history data]

In the first embodiment described hereinabove, channel history data is generated by scanning the channel selection status of the tuner 1M periodically at a fixed time interval. In contrast therewith, the second embodiment is so constituted that, in response to a user's manipulation for selection of a channel, the content of the channel selection is stored as channel history data in a memory, and a decision is made as to whether any frequent reception channel is existent or not with reference to the past history data at the timing of such manipulation for channel selection, and automatic video recording is performed or a message is displayed as mentioned.

More specifically, the channel number selected by the user's manipulation of the remote commander or by his depression of the channel selection button in the television receiver is stored, together with the time data representing the relevant time point, as a channel history table in the SRAM 105. Since such manipulation for channel selection is performed at an arbitrary timing in this case, the data representing the selected program channel number (or the data of channel selection control signal) and the time data thereof are recorded as a channel history table.

The past channel history table is searched in response to reception of a remote control signal or to depression of the button, and a decision is made as to whether there exists any program channel received more frequently than a predetermined rate on the same day of week and at the same hour in the past. And if any channel that satisfies such condition is existent, it is regarded as a frequent reception channel. And similarly to the aforementioned procedure, a message and a PinP child picture are displayed on the screen, and automatic recording is performed adequately.

[Another embodiment of broadcast receiving apparatus]

Following the above embodiment which represents an exemplary receiving apparatus for ground broadcast waves, an explanation will now be given on another embodiment where the present invention is applied to digital satellite broadcasting started initially in the United States. In Japan, the frequency band in the aforementioned analog ground-wave broadcasting is divided at a regular interval of 6 MHz for example, and the divided frequency bands are used as broadcast transmission channels in such a manner that one channel is allocated to one broadcasting station, i.e., each station has one program channel. Therefore, a program of a specific broadcasting station (program channel) can be selectively received by selecting one broadcast transmission channel.

However, in the digital satellite broadcasting, transmission channels are not coincident with program channels (which correspond to broadcasting stations in this embodiment), and each channel does not signify a specific frequency band. This is based on the purpose of efficiently utilizing the broadcast frequency band.

In the digital satellite broadcasting, video and audio signals are transmitted through data compression according to the MPEG1 or MPEG2 standard, so that the amount of required data to be transmitted is small in a program with slight-motion pictures, whereas the amount of required data is great in a sport program or the like with active-motion pictures if a superior broadcast is requisite without deterioration of the picture quality. Therefore, in broadcasting one program, the broadcast frequency or frequency group to be used is changed in accordance with the amount of the broadcast data to consequently achieve effective utilization of the broadcast frequency band. More specifically, when the data amount is small, a plurality of programs can be broadcast at a single frequency or frequency group. On the contrary, when the data amount is great, a plurality of frequencies or frequency groups may be needed for broadcasting a single program.

Thus, since the situation of using broadcast waves for program channels is not fixed in the digital satellite broadcasting, some data is transmitted as a broadcast signal of a specific frequency group to indicate how the other broadcast frequencies or frequency groups are used for the program channels. In this specification, such data is termed an index channel.

The data of such index channel includes data of a broadcast schedule with titles of programs. Therefore, in the digital satellite broadcasting, the title of any broadcast program can be obtained from the index channel in case the relevant program channel and time are detectable. Accordingly, if the data of program titles is stored together with the data of frequent reception channel history, it becomes possible to inform the user of the program title as frequent reception program data in addition to the program channel. In other words, the program title can be included in a message which signifies the existence of a frequent reception program on the other channel.

In digital television broadcasting, it is not necessary to provide two tuners, which are replaceable with one program selector and two decoders. Since there is no coincidence between a broadcast-wave transmission channel and a program channel, it follows in this case that a program channel is stored as channel history data for channel selection.

Figure 11:
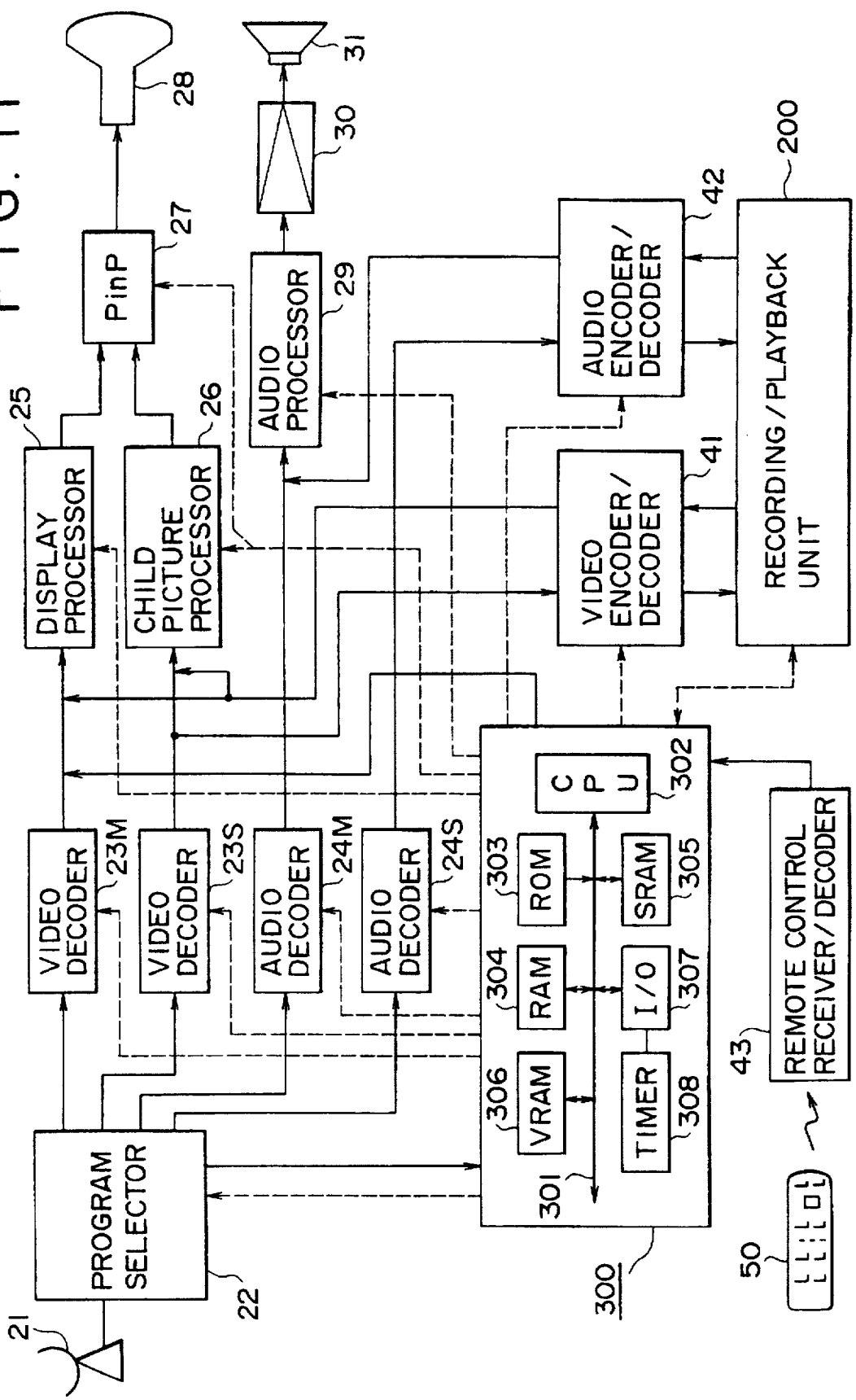
FIG. 11 is a block diagram of another embodiment representing the broadcast receiving apparatus of the invention.

FIG. 11 is a block diagram showing an exemplary constitution of a receiving apparatus in this embodiment. Reference numeral 21 denotes a satellite broadcast antenna. Digital broadcast waves received by this antenna 21 are supplied to a program selector 22. As will be described in detail later, the program selector 22 first selects a program channel in response to a control signal from a system controller 300, then selects an index channel from the broadcast signal, and further extracts a video data packet and an audio data packet of the program channel designated by a user.

The program selector 22 is capable of extracting video and audio data packets of not only a single program channel but also those of a plurality of program channels. The receiving apparatus of this embodiment is so contrived as to extract video and audio data packets of two program channels. In the following description, data packets of one program channel and the other program channel will be termed those of a main channel and a sub channel, respectively.

The compressed video data of the MPEG1 or MPEG2 standard of the main channel extracted by the program selector 22 is supplied to a video data decoder 23M, while the compressed video data of the sub channel is supplied to a video data decoder 23S, wherein such video data are decoded, expanded and interpolated respectively.

The video data decoder 23M supplies its output video data in the form of a frame image to a video display processor 25, while the video data decoder 23S supplies its output video data also in the form of a frame image to a child picture processor 26.

The video display processor 25 writes the frame image in a prescribed period into a frame memory which is incorporated in this processor 25 and, after digital-to-analog conversion thereof, delivers the converted frame image via a PinP processor 27 to a display device, i.e., a CRT display device 28 in this embodiment. Thus, the picture of the main program selected and designated by the user is displayed on the screen of the CRT display device 28.

The child picture processor 26 compresses the frame image to generate data for displaying its picture in a portion of the screen of the display device 28, then writes such data in a prescribed period into the memory and, after digital-to-analog conversion thereof, supplies the converted data to the PinP processor 27.

In response to a PinP command from the system controller 300, the PinP processor 27 superimposes the video signal from the video display processor 25 in such a manner as to display the picture of the video signal from the child picture processor 26 at a screen position designated previously or designated by a position signal included in the PinP command. Accordingly, when a PinP command is inputted from the system controller 300, the picture of the sub channel program is displayed as a partial child picture at the designated screen position on the picture of the main channel program.

Meanwhile the compressed MPEG-format audio data of the main and sub channels extracted by the program selector 22 are supplied to audio data decoders 24M and 24S respectively, from which the data are outputted in the form of digital signal after being decoded and expanded.

The audio data from the audio data decoder 24M is supplied via an audio processor 29 and an amplifier 30 to a loudspeaker 31, where the audio signal of the main program is reproduced. In the audio processor 29, there are executed digital-to-analog conversion of the digital audio data, and also sound volume and tone control actions in response to control signals which are obtained from the system controller 300 in accordance with the user's manipulations of a remote commander 50 for volume and tone control.

The audio data from the sub-channel audio data decoder 24S represents the sound of the program displayed on the PinP child screen, and therefore it is not a direct object to be reproduced by the loudspeaker 31, as mentioned already. In this embodiment, however, such audio data is stored in a recording/playback unit 200, as will be described later.

The system controller 300 consists of a microcomputer with a system bus 301, to which there are connected a CPU 302, a ROM 303 where fixed data are stored such as image data and character font data for displaying programs to be executed and a table thereof, a RAM 304 which is a volatile memory used in a work area and so forth, an SRAM 305 which is a nonvolatile memory for storage of data to be retained, a video RAM 306, and a timer (clock circuit) 308 via an I/O port 302.

When the user manipulates the remote commander 50, a remote control signal of infrared rays or the like corresponding to the user's manipulation is transmitted from the remote commander 50 to a remote control receiver/decoder 43. Then the remote control receiver/decoder 43 decodes the received remote control signal and inputs the same to the system controller 300 via an unshown I/O port. Subsequently the system controller 300 interprets the input digital remote control signal and executes the program of the ROM 303 in a manner to perform a control action conforming with the user s manipulation of the remote commander 50.

And in response to a manipulation of the remote commander 50 performed to select a desired program channel, the video and audio data packets of the selected channel are extracted.

In extracting such data packets, the system controller 300 receives the index data of the index channel from the program selector 22 as mentioned and, with reference to the data of the channel allocation data packet, identifies the frequency or frequency group to which the program channel selected by the user's manipulation of the remote commander 50 is allocated.

Subsequently the system controller 300 sends to the program selector 22 a selection control signal corresponding to the result of such identification, thereby controlling the program selector 22 in a manner to select the video and audio data packets of the channel designated by the user. In this case, the system controller 300 is capable of storing the program title of the selected program channel and so forth in the RAM 304.

As described, the data of allocation of frequencies or frequency groups to channels are successively changed in accordance with the broadcast waves at that time and are broadcast periodically with the index channels thereof transmitted as channel allocation data packets. Therefore, the system controller 300 in this embodiment requests the program selector 22 to transfer the index channel data packets periodically. And in response to the request from the system controller 300, the program selector 22 returns the index channel data packets to the system controller 300, which is thereby enabled to continuously supervise the allocation of the frequencies or frequency groups to the channels.

Similarly, the system controller 300 periodically requests the program selector 22 to transfer the index channel data packets of the present time, program schedule and so forth, and in response to such a request, the program selector 22 transfers the required data packets to the system controller 300.

Differing from the above example where the system controller 300 periodically sends a request to the program selector 22 for acquisition of the required index channel data packets, it is also possible to preset the operation in such a manner that, whenever the program selector 22 has found the aforesaid index channel data packet, the program selector 22 transfers such data packet to the system controller 300. In another modification, regardless of a request from the system controller 300, the program selector 22 may periodically notify the system controller 300 of the designated data packet found until then.

The receiving apparatus of this embodiment is equipped with a recording/playback unit 200, as shown in FIG. 11. This recording/playback unit 200 has a construction adapted for recording or playback of a mini disk which is a recordable and reproducible magneto-optical disk.

In response to the user's manipulation of the remote commander 50 for commanding the recording/playback unit 200 to perform a recording operation, the system controller 300 supplies video data from the video data decoder 23S to a video encoder/decoder 41, and also supplies audio data from the audio data decoder 24S to an audio encoder/decoder 42.

The video encoder/decoder 41 encodes the video data from the video data decoder 23S into a format suited to be recorded by the recording/playback unit 200. In this embodiment, the video data is encoded into the MPEG1 format so as to be recordable on the aforementioned magneto-optical disk.

Similarly, the audio encoder/decoder 42 encodes the audio data from the audio data decoder 24S into a format suited to be recorded on the mini disk. More specifically, there is adopted a method of first dividing the audio data into a plurality of bands in such a manner that the band width becomes gradually greater with rise of the frequency, then forming each of the divided bands into a block composed of a plurality of samples (preferably the number of such samples is the same in each band), subsequently executing discrete cosine transformation per block of each band to thereby obtain coefficient data, and executing bit allocation to each block on the basis of such coefficient data. The method of data compression in this case is carried out in consideration of the human auditory sensation to sound, hence realizing remarkably efficient data compression. According to this embodiment, the audio data can be compressed approximately to ⅕ for example.

When the recording/playback unit 200 is set in its playback mode, the video encoder/decoder 41 and the audio encoder/decoder 42 receive the reproduced video data and audio data respectively from the recording/playback unit 200 and then decode the input data. The decoded video data is outputted via a video display processor 25 to a CRT display device 28 to be displayed thereon, while the decoded audio data is outputted via an audio processor 29 to a loudspeaker 31, from which the reproduced sound is emitted.

Figure 12:
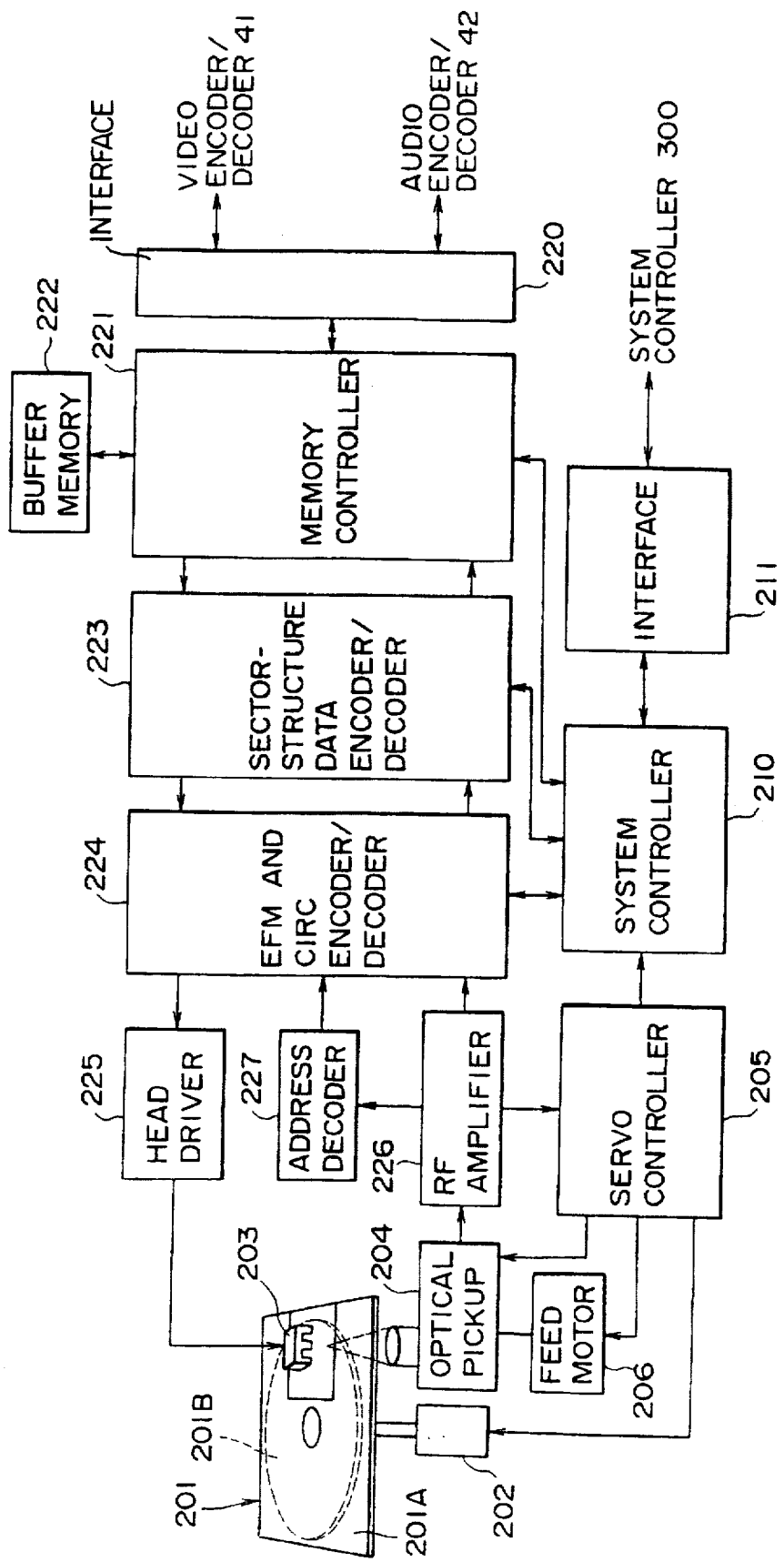
FIG. 12 is a partial block diagram of the embodiment shown in FIG. 11.

FIG. 12 shows an exemplary concrete construction of the recording/playback unit 200.

In FIG. 12, reference numeral 201 denotes a magneto-optical disk (mini disk). For protection from dust and prevention of flaw, the mini disk 201 employed in this embodiment is so contrived that a disk 201B having a diameter of 64 mm is housed in a cartridge 201A. On the disk 201B, there is previously formed a pregroove for light spot control (tracking control) and, particularly in this embodiment, absolute address data is recorded in the pregroove in such a manner as to be superimposed on a wobbling signal used for tracking.

The disk 201B is rotated by means of a spindle motor 202. The rotation of the spindle motor 202 is controlled by a servo control circuit 205 so that the disk 201B is rotated at a constant linear velocity. The disk cartridge 201A is provided with a shutter, and this shutter is opened when the disk cartridge 201A is placed on a disk mounting tray and is loaded in the recording/playback unit. A recording magnetic head 203 is disposed above an opening of the shutter of the disk 201B, and an optical pickup 204 is disposed under the opening of the shutter of the disk 201B.

The optical pickup 204 is moved under control by a feed motor 206 in the diametrical direction of the disk 201B. And focusing and tracking control actions are performed for the optical pickup 204 by the servo control circuit 205.

The system controller 210 incorporated in the recording/playback unit 200 is equipped with a microcomputer and transfers control data and undermentioned UTOC data via a communication interface 211 to or from another system controller 300, thereby managing the entire operation of the unit 200.

The signal line configuration in the recording/playback unit 200 of the embodiment shown in FIG. 12 is devised to be maximally simplified by employing ICs. And depending on a recording mode or a playback mode, each circuit is selectively switched by a mode switching signal obtained from the system controller.

The video encoder/decoder 41 and the audio encoder/decoder 42 are connected to the signal line of the recording/playback unit 200 via an interface 220 so that recording and playback signals are transferred therebetween.

The recording data inputted via the interface 220 is once stored, via a memory controller 221, in a buffer memory 222 controlled by the memory controller 221. In this embodiment, the buffer memory 222 consists of a DRAM having a data storage capacity of 1M to 4M bits.

If there occurs none of track jump which is a phenomenon that the recording position on the disk 201B is accidentally deviated by some shock or the like during a recording operation, the memory controller 221 sequentially reads out the compressed data from the buffer memory 222 approximately at a 5-fold transfer rate higher than the writing rate and then transfers the read data to a sector-structure data encoder/decoder 223.

In response to a detection of any track jump during the recording operation, the memory controller 221 halts the data transfer to the data encoder/decoder 223 and stores the compressed data, which is inputted via the interface 220, into the buffer memory 222. And upon completion of correcting the recording position, the memory controller 221 resumes the data transfer under control from the buffer memory 222 to the data encoder/decoder 223.

Occurrence of a track jump can be detected by providing a vibration meter or the like in the apparatus and detecting if the amplitude of the vibration or shock is sufficiently great to cause a track jump. Since absolute address data is recorded in the pregroove on the disk 201B in this embodiment as described, it is also possible to achieve a similar detection by reading out the absolute address data during the recording operation and then detecting a track jump from the decoded output of such address data. Further a track jump may be detected from the OR of the vibration meter and the absolute address data. Upon occurrence of a track jump, it is necessary to lower the power of a laser beam used for magneto-optical recording or to reduce such power to zero.

Correction of the recording position after occurrence of a track jump can be performed by using the absolute address data mentioned above. In this case, the data storage capacity of the buffer memory 222 needs to be sufficient for storing at least the compressed data which corresponds to the time period from occurrence of the track jump to proper correction of the recording position. The capacity of the buffer memory 222 in this embodiment ranges from 1M to 4Mbits as described, and it is sufficiently large to satisfy the aforementioned conditions with an adequate margin.

In the recording mode, the memory controller 221 executes a memory control action in such a manner that, during a normal operation, the data stored in the buffer memory 222 is minimized. More specifically, when the data stored in the buffer memory 222 has exceeded a predetermined amount, the data of a predetermined amount (e.g., 32 sectors each of which is equal to 1 CD-ROM sector of approximately 2 Kbytes) is read out from the buffer memory 222 so that a writing space greater than the predetermined data amount can be continuously maintained in the memory.

The data encoder/decoder 223 encodes the compressed data, which is transferred from the buffer memory 222, into sector-structure data adapted for a CD-ROM. Hereinafter 36-sector data including data of 32 sectors will be referred to as a cluster. As will be described later, recording or playback of the data is performed per cluster as a unit.

The output data of the data encoder/decoder 223 is supplied to an EFM and CIRC encoder/decoder 224, which then executes a process of encoding the data for error detection and correction, and also a process of modulating the data to be suited for recording, e.g., EFM (8–14 modulation) in this embodiment. The error detection and correction code used in this embodiment is ACIRC (Add-on Interleave+CIRC) formed by changing the interleave in CIRC (Cross Interleave Reed-Solomon Code) employed for CD.

The recording data is intermittent and constitutes a unitary cluster composed of 36 sectors in which a total of four sectors (hereinafter referred to as linking sectors) for connection of clusters are added before and after the data of 32 sectors.

The two encoder/decoder circuits 223 and 224 can be integrated into a single IC.

The recording data thus formed is supplied via a head driver circuit 225 to a recording magnetic head 203, whereby a magnetic field modulated with the recording data is applied to the disk 201B (magneto-optical disk). Meanwhile a laser beam from the optical pickup 204 is irradiated onto the disk 201B.

The optical pickup 204 comprises a laser light source such as a laser diode, optical component parts including a collimator lens, an objective lens, a polarized beam splitter and a cylindrical lens, and a photo detector. In the recording mode, the recording track is irradiated with a laser beam of a fixed power which is greater than that in the playback mode. And the data is recorded thermomagnetically on the disk 201B by such laser beam irradiation and the modulated magnetic field from the magnetic head 203. The magnetic head 203 and the optical pickup 204 are so constructed as to be movable synchronously with each other in the radial direction of the disk 201.

During the recording operation, the output of the optical pickup 204 is supplied via an RF amplifier 226 to an address decoder 227, which then extracts and decodes the absolute address data recorded with the wobbling signal in the pregroove formed along the track on the disk 201B. And the absolute address data thus detected is supplied to the EFM and CIRC encoder/decoder circuit 224, so that the absolute address data is inserted into the recording data and is recorded on the disk. Meanwhile the absolute address data is supplied also to the system controller 210 so as to be used for identification and control of the recording position.

The signal from the RF amplifier 226 is supplied to the servo controller 205, where a signal for servo-controlling the linear velocity of the spindle motor 202 at a constant value is produced out of the signal obtained from the pregroove on the disk 201B, so that the linear velocity of the spindle motor 202 is properly controlled.

Next the operation in the playback mode will be described below. In this mode, a control signal is produced in the servo controller 205 out of the signal obtained from the pregroove in the same manner as in the recording mode, and the spindle motor 202 is controlled by this control signal to thereby rotate the disk 201B at the same constant linear velocity as in the recording mode.

During the playback operation, the optical pickup 204 detects a reflected beam of the original laser beam irradiated onto the desired target track, hence detecting a focus error by an astigmatic method for example while detecting a tracking error by a push-pull method for example, and further detecting the difference of the polarization angle (Kerr rotation angle) of the reflected bee from the desired target track. And thus the optical pickup 204 outputs a playback RF signal.

The output of the optical pickup 204 is supplied to the RF amplifier 226. Then the RF amplifier 226 extracts the focus error signal and the tracking error signal from the output of the optical pickup 204 and supplies the extracted signals to the servo controller 205. The RF amplifier 226 further converts the playback signal into a binary signal and supplies the same to the EFM and CIRC encoder/decoder circuit 224.

The servo controller 205 executes focus control of the optical system of the optical pickup 204 in a manner to reduce the focus error signal to zero, and also executes tracking control of the optical system of the optical pickup 204 in a manner to reduce the tracking error signal to zero.

The output of the RF amplifier 226 is supplied also to the address decoder 227, where the absolute address data obtained from the pregroove is extracted and decoded. And the absolute address data thus extracted by the decoder 227 is supplied via the EFM and CIRC encoder/decoder circuit 224 to the system controller 210 so as to be used for control of the playback position of the optical pickup 204 by the servo controller 205 in the radial direction of the disk. The system controller 210 is further capable of using the address data of each unitary sector, which is extracted from the playback data, for managing the position on the recording track being scanned by the optical pickup 204.

In the playback mode, as will be described later, the compressed data read out from the disk 201B is once written in the buffer memory 222 and then is read out therefrom and expanded. In this case, the operation of the optical pickup 204 to read out the data from the disk 201B is performed intermittently because of the difference between the transfer rates of the two data, so that the data stored in the buffer memory 222 is not rendered smaller in amount than a predetermined value.

In the EFM and CIRC encoder/decoder circuit 224, the EFM signal supplied thereto via the RF amplifier 226 is demodulated and processed for error correction. Subsequently the output of the EFM and CIRC encoder/decoder circuit 224 is supplied to the sector-structure data encoder/decoder circuit 223, where the CD-ROM sector structure is dissolved and the data is decoded to the former compressed state.

The output of the data encoder/decoder circuit 223 is once stored in the buffer memory 222 via the memory controller 221. And if there occurs none of track jump which is a phenomenon that the playback position is deviated accidentally by some shock or the like during the playback operation, the memory controller 221 successively reads out the compressed data from the circuit 223 at a low transfer rate which is approximately 1/5 of the write rate, and then transfers the read data via the interface 220 to the video encoder/decoder 41 and/or the audio encoder/decoder 42.

In this case, the memory controller 221 controls the storage action in such a manner that, during a normal operation, a predetermined amount of data larger than a minimum requisite is stored in the buffer memory 222. For example, the storage action is so controlled that, when the amount of the data in the buffer memory 222 has become smaller than a predetermined amount, the data from the disk 201B is acquired intermittently by the optical pickup 204, and the data from the data encoder/decoder circuit 223 is written so that a read space greater than the predetermined data amount is always ensured.

The video data thus reproduced in the recording/playback unit 200 and supplied to the video encoder/decoder 41 is decoded, expanded and interpolated in accordance with the MPEG1 format by the video encoder/decoder 41 and then is supplied via the video display processor 25 to the CRT display device 28 to be thereby displayed visually on its screen.

Meanwhile the audio data reproduced in the recording/playback unit 200 is decoded and expanded by the audio encoder/decoder 42 and then is supplied via the audio processor 29 to the loudspeaker 31, from which the audio output is emitted as sound.

In this digital broadcast receiving apparatus also, similarly to the aforementioned analog television broadcast, a first embodiment of a channel history data generating method is carried out by periodically scanning the selection status of program channels decoded by the main decoders 23M and 24M in the program selector 22, hence generating channel history data, and storing such data in the SRAM 305. The timing for periodically scanning the selection status is obtained from the timer 308. In this embodiment, the timer 308 is driven by an independent power source different from the one employed for the receiving apparatus.

Then, at a timing different from the one to acquire the channel history data, a decision is made as to whether any frequent reception channel is existent or not in the history data on the same day of week and at the same hour as the present time point. And if there exists a frequent reception channel in the history and such channel is not being watched at the present time point, a message similar to the aforementioned example is displayed, and further the relevant program is displayed in a PinP mode. And when necessary, it is digitally recorded on the disk by the recording/playback unit 200.

In the broadcast receiving apparatus of FIG. 11 also, a second embodiment of a channel history data generating method is carried out by acquiring a channel history in response to an actuation for selecting a program channel, and storing such history data in the SRAM 305 together with hour data. Such hour data is obtained from the timer 308. In selecting a program channel, a user refers to program data included in the index data of an index channel, so that the title of the selected program can also be obtained from the index data. In this embodiment, therefore, the program title is stored together with the channel history data.

In a decision executed with regard to the existence of any frequent reception channel simultaneously with selection of a program channel, if the existence of any frequent reception channel is detected, the program title thereof is displayed on the screen of the display device together with a message which notifies the user of such existence.

When there exists a favorite program on any frequent reception channel and it is not being watched now, similarly to the aforementioned example, the video and audio data of the relevant channel are compressed and then are recorded automatically on the disk. And the history thereof is recorded in a UTOC (User Table Of Content).

In this embodiment where both the video and audio data are recorded in a compressed form, it is possible to record a greater amount of data.

Although the present invention has been explained hereinabove with respect to television broadcast, it is to be noted that the invention is applicable to radio broadcast as well. In the latter case, a disk medium such as an MD is usable in a recording/playback unit. Since a recording history is automatically stored in a UTOC area of an MD for example, the radio broadcast programs thus stored automatically can be known with facility by reading out the contents of the UTOC area.

According to the present invention, as mentioned above, any frequent reception channel usually received and watched by a user is detected from a past reception history, and when the frequent reception channel thus detected is not being watched now, it is recorded automatically by a recording/playback unit, so that the user is enabled to watch later the favorite program on the frequent reception channel merely by reproducing the program in the recording/playback unit.

Further according to the present invention, the favorite broadcast program on the frequent reception channel is automatically recorded if it is not watched during the broadcast, whereby there is attainable an advantageous effect that automatic recording of the program can be performed even if the receiving apparatus is in its switched-off state during the absence of the user from home for example. And due to the convenience of automatic recording, none of complicated presetting manipulation or the like is needed differently from reserved video recording.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. A broadcast receiving apparatus having a channel selection control signal generator means for generating a channel selection control signal in response to a channel selecting manipulation performed by a user, and a channel selector means for selecting a desired program channel from broadcast waves in response to the channel selection control signal, said apparatus further comprising:
   a channel history memory for storing program channels, which have been selected by said channel selector means on a plurality of occasions during a predetermined number of past weeks, each selected program channel being stored with an indication of the day of the week and the hour of the day;
   a decision means for checking the stored contents of said channel history memory and making a decision as to whether any frequent reception program channel selected and received at a frequency higher than a predetermined value exists on the same day of the week and at the same hour during said predetermined number of past weeks; and
   a control means responsive to a detection of the existence of any frequent reception program channel executed by said decision means and generating a control signal to instruct recording of the signal of the frequent reception program channel.

2. The broadcast receiving apparatus according to claim 1, wherein said control means generates, in response to a detection of the existence of any frequent reception program channel executed by said decision means, a control signal to instruct recording of the signal of the frequent reception program channel on a recording medium only when said frequent reception program channel is not being selected by said channel selector means.

3. The broadcast receiving apparatus according to claim 2, wherein said control signal includes a channel selection command for instructing a selection of the frequent reception program channel being broadcast at present, and a recording start command for instructing a start of recording the signal of said frequent reception program channel on said recording medium.

4. The broadcast receiving apparatus according to claim 1, further comprising a recording/playback unit incorporated therein integrally to record the signal of said frequent reception program channel on a recording medium, wherein said control signal is supplied to said recording/playback unit, and the signal of said frequent reception program channel is recorded by said recording/playback unit on the basis of the control signal obtained from said control means.

5. The broadcast receiving apparatus according to claim 1, further comprising a control signal output means for transferring the control signal to an external recording/playback unit connected to an outside of said broadcast receiving apparatus, wherein the signal of said frequent reception program channel is recorded on a recording medium loaded in said recording/playback unit.

6. The broadcast receiving apparatus according to claim 5, wherein said control signal output means converts the control signal into an infrared signal and transmits the control signal to said external recording/playback unit.

7. The broadcast receiving apparatus according to claim 1, further comprising a storage means for storing a history of the signal of said frequent reception program channel in response to generation of the control signal by said control means.

8. A broadcast receiving apparatus having a channel selection control signal generator means for generating a channel selection control signal in response to a channel selecting manipulation performed by a user, and a channel selector means for selecting a desired program channel from broadcast waves in response to the channel selection control signal, said apparatus further comprising:
   a channel history memory for storing program channels, which have been selected by said channel selector means on a plurality of occasions during past weeks, corresponding to the days of the weeks and the hours relative to the channel selections;
   a decision means for checking the stored contents of said channel history memory and making a decision as to whether any frequent reception program channel selected and received at a frequency higher than a predetermined value exists on the same day of the week and at the same hour in the past; and
   a control means responsive to a detection of the existence of any frequent reception program channel executed by said decision means and generating a control signal to instruct recording of the signal of the frequent reception program channel
   wherein said channel selector means includes a first channel selector and a second channel selector; and said control means supplies, in response to a detection of the existence of any frequent reception program channel executed by said decision means, a channel selection command to said second channel selector for instructing a selection of the frequent reception program channel being broadcast at present, only when said frequent reception program channel is not selected by said first channel selector, and instructs a start of recording the signal of said frequent reception program channel on a recording medium.

9. The broadcast receiving apparatus according to claim 8, further comprising:
   a control means for generating a control signal in response to a detection of the existence of any frequent reception program channel executed by said decision means and when some program channel other than said frequent reception program channel is being received by said first channel selector, so as to instruct said second channel selector to receive said frequent reception program channel; and
   a signal processing means for processing signals in such a manner that a picture of a program channel being received by said first channel selector is displayed on a main screen while a picture of said frequent reception program channel being received by said second channel selector is displayed on a subsidiary screen.

10. The broadcast receiving apparatus according to claim 9, wherein, when no command is transmitted by a user to select said frequent reception program channel by said first channel selector within a predetermined period of time from the start of displaying the picture of said frequent reception program channel on the subsidiary screen, said signal processing means discontinues displaying the picture on said subsidiary screen, and said control means generates said control signal.

11. A broadcast receiving apparatus having a channel selection control signal generator means for generating a channel selection control signal in response to a channel selecting manipulation performed by a user, and a channel selector means for selecting a desired program channel from broadcast waves in response to the channel selection control signal, said apparatus further comprising:

a channel history memory for storing program channels, which have been selected by said channel selector means on a plurality of occasions during past weeks, corresponding to the days of the weeks and the hours relative to the channel selections;

a decision means for checking the stored contents of said channel history memory and making a decision as to whether any frequent reception program channel selected and received at a frequency higher than a predetermined value exists on the same day of the week and at the same hour in the past; and a control means responsive to a detection of the existence of any frequent reception program channel executed by said decision means and generating a control signal to instruct recordinq of the signal of the frequent reception program channel further comprising a channel history write means for measuring the present date, day and hour while checking received program channels at a predetermined time interval, and storing the result thereof in said channel history memory.

12. The broadcast receiving apparatus according to claim 11, wherein said channel history write means deletes from said channel history memory old data after a lapse of a predetermined time period.

13. The broadcast receiving apparatus according to claim 11, wherein said channel history write means checks the received program channels at a predetermined time interval only when said broadcast receiving apparatus is switched on, and stores the result thereof in said channel history memory.

14. A broadcast receiving apparatus having a channel selection control signal generator means for generating a channel selection control signal in response to a channel selecting manipulation performed by a user, and a channel selector means for selecting a desired program channel from broadcast waves in response to the channel selection control signal, wherein said channel selector means includes a first channel selector and a second channel selector, said broadcast receiving apparatus further comprising:

a channel history memory for storing program channels, which have been selected by said channel selector means on a plurality of occasions during past weeks, corresponding to the days of the weeks and the hours relative to the channel selections;

a decision means for checking the stored contents of said channel history memory and making a decision as to whether any frequent reception program channel selected and received at a frequency higher than a predetermined value exists on the same day of the week and at the same hour in the past;

a control means responsive to a detection of the existence of any frequent reception program channel executed by said decision means and generating a control signal to instruct reception of said frequent reception program channel by said second channel selector when some program channel other than said frequent reception program channel is being received by said first channel selector; and a signal processing means for processing signals in such a manner that a picture of program channel received by said first channel selector is displayed on a main screen while a picture of said frequent reception program channel received by said second channel selector is displayed on a subsidiary screen.

15. The broadcast receiving apparatus according to claim 14, further comprising a message generator means for generating a message which notifies the user that a frequent reception program channel is being broadcast at present besides the program channel being received by said first channel selector, wherein said message is displayed together with the pictures on said main and subsidiary screens.

16. The broadcast receiving apparatus according to claim 14, wherein, after a lapse of a predetermined time period, said signal processing means discontinues displaying the picture of said frequent reception program channel, which is being received by said second channel selector, on the subsidiary screen.

17. The broadcast receiving apparatus according to claim 14, further comprising a channel history write means for measuring the present date, day and hour while checking received program channels at a predetermined time interval, and storing the result thereof in said channel history memory.

18. The broadcast receiving apparatus according to claim 17, wherein said channel history write means deletes from said channel history memory old data after a lapse of a predetermined time period.

19. The broadcast receiving apparatus according to claim 17, wherein said channel history write means checks the received program channels at a predetermined time interval only when said broadcast receiving apparatus is switched on, and stores the result thereof in said channel history memory.

* * * * *